US010662495B2

(12) United States Patent
Kawasaki et al.

(10) Patent No.: US 10,662,495 B2
(45) Date of Patent: *May 26, 2020

(54) HIGH-STRENGTH STEEL SHEET AND PRODUCTION METHOD FOR SAME, AND PRODUCTION METHOD FOR HIGH-STRENGTH GALVANIZED STEEL SHEET

(71) Applicant: JFE STEEL CORPORATION, Chiyoda-ku, Tokyo (JP)

(72) Inventors: Yoshiyasu Kawasaki, Tokyo (JP); Hiroshi Matsuda, Tokyo (JP); Kazunori Tahara, Tokyo (JP); Takeshi Yokota, Tokyo (JP); Kaneharu Okuda, Tokyo (JP); Kazuhiro Seto, Tokyo (JP)

(73) Assignee: JFE STEEL CORPORATION, Chiyoda-ku, Tokyo (JP)

( * ) Notice: Subject to any disclaimer, the term of this patent is extended or adjusted under 35 U.S.C. 154(b) by 375 days.

This patent is subject to a terminal disclaimer.

(21) Appl. No.: 15/326,116

(22) PCT Filed: Aug. 5, 2015

(86) PCT No.: PCT/JP2015/003949
§ 371 (c)(1),
(2) Date: Jan. 13, 2017

(87) PCT Pub. No.: WO2016/021198
PCT Pub. Date: Feb. 11, 2016

(65) Prior Publication Data
US 2017/0218472 A1 Aug. 3, 2017

(30) Foreign Application Priority Data

Aug. 7, 2014 (JP) ................................. 2014-161685

(51) Int. Cl.
*C21D 9/46* (2006.01)
*C22C 38/00* (2006.01)
*C22C 38/04* (2006.01)
*C22C 38/60* (2006.01)
*B32B 15/01* (2006.01)
*C21D 1/60* (2006.01)
(Continued)

(52) U.S. Cl.
CPC .............. *C21D 9/46* (2013.01); *B32B 15/013* (2013.01); *C21D 1/60* (2013.01); *C21D 8/0226* (2013.01); *C21D 8/0236* (2013.01); *C21D 8/0263* (2013.01); *C21D 8/0278* (2013.01); *C22C 38/00* (2013.01); *C22C 38/001* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/12* (2013.01); *C22C 38/14* (2013.01); *C22C 38/16* (2013.01); *C22C 38/38* (2013.01); *C22C 38/60* (2013.01); *C23C 2/06* (2013.01); *C23C 2/28* (2013.01); *C23C 2/40* (2013.01); *C23G 1/00* (2013.01); *C21D 2211/001* (2013.01); *C21D 2211/002* (2013.01); *C21D 2211/005* (2013.01); *C21D 2211/008* (2013.01)

(58) Field of Classification Search
CPC .......... C21D 9/46; C21D 1/60; C21D 8/0226; C21D 8/0236; C21D 8/0263; C21D 8/0278; C21D 2211/001; C21D 2211/002; C21D 2211/005; C21D 2211/008; C22C 38/002; C22C 38/16; C22C 38/14; C22C 38/001; C22C 38/38; C22C 38/005; C22C 38/008; C22C 38/02; C22C 38/06; C22C 38/12; C22C 38/60; C22C 38/04; C22C 38/00; C23C 2/40; C23C 2/06; C23C 2/28; B32B 15/013; C23G 1/00
See application file for complete search history.

(56) References Cited

U.S. PATENT DOCUMENTS 6,818,074 B2 11/2004 Matsuoka et al.
8,828,557 B2 9/2014 Takagi et al.
(Continued)

FOREIGN PATENT DOCUMENTS

CA 2866130 A1 9/2013
CN 1396295 A 2/2003
(Continued)

OTHER PUBLICATIONS

Dec. 6, 2017, Extended European Search Report issued by the European Patent Office in the corresponding European Patent Application No. 15829521.2.
Nov. 10, 2015, International Search Report issued in the International Patent Application No. PCT/JP2015/003949.
Nov. 1, 2017, Office Action issued by the State Intellectual Property Office in the corresponding Chinese Patent Application No. 201580042277.3, with English language Search Report.
Aug. 21, 2019, Office Action issued by the United States Patent and Trademark Office in the corresponding U.S. Appl. No. 15/326,540.
(Continued)

Primary Examiner — John A Hevey
(74) Attorney, Agent, or Firm — Kenja IP Law PC

(57) ABSTRACT

Disclosed is a high-strength steel sheet having a tensile strength (TS) of 780 MPa or more and excellent in ductility, fatigue properties, stretch flangeability, surface characteristics, and sheet passage ability that can be obtained by providing a predetermined chemical composition and a steel microstructure that contains, by area, 20-50% of ferrite, 5-25% of bainitic ferrite, 1-10% of martensite, and 5-15% of tempered martensite, and that contains, by volume, 10% or more of retained austenite, in which the retained austenite has a mean grain size of 2 μm or less, a mean Mn content in the retained austenite in mass % is at least 1.2 times the Mn content in the steel sheet in mass %, the retained austenite has a mean free path of 1.2 μm or less, and the tempered martensite has a mean free path of 1.2 μm or less.

3 Claims, No Drawings

(51) Int. Cl.

| | |
|---|---|
| *C21D 8/02* | (2006.01) |
| *C22C 38/02* | (2006.01) |
| *C22C 38/06* | (2006.01) |
| *C22C 38/12* | (2006.01) |
| *C22C 38/14* | (2006.01) |
| *C22C 38/16* | (2006.01) |
| *C22C 38/38* | (2006.01) |
| *C23C 2/06* | (2006.01) |
| *C23C 2/28* | (2006.01) |
| *C23C 2/40* | (2006.01) |
| *C23G 1/00* | (2006.01) |

(56) References Cited

U.S. PATENT DOCUMENTS

| | | | |
|---|---|---|---|
| 8,876,987 B2 | 11/2014 | Matsuda et al. | |
| 9,896,751 B2* | 2/2018 | Kawata | C23C 2/06 |
| 2005/0019601 A1 | 1/2005 | Matsuoka et al. | |
| 2011/0146852 A1 | 6/2011 | Matsuda et al. | |
| 2012/0279617 A1 | 11/2012 | Kawasaki et al. | |
| 2012/0305144 A1 | 12/2012 | Okamoto et al. | |
| 2013/0133792 A1* | 5/2013 | Nakagaito | C21D 1/25 |
| | | | 148/645 |
| 2013/0330226 A1* | 12/2013 | Murakami | C21D 8/0426 |
| | | | 420/83 |
| 2014/0050941 A1 | 2/2014 | Kawasaki et al. | |
| 2014/0242414 A1* | 8/2014 | Minami | C23C 2/02 |
| | | | 428/659 |
| 2014/0242416 A1* | 8/2014 | Matsuda | C21D 8/02 |
| | | | 428/659 |
| 2015/0034218 A1* | 2/2015 | Krizan | C21D 8/0226 |
| | | | 148/623 |
| 2015/0184274 A1 | 7/2015 | Kakiuchi et al. | |
| 2017/0218472 A1 | 8/2017 | Kawasaki et al. | |

FOREIGN PATENT DOCUMENTS

| | | | | |
|---|---|---|---|---|
| CN | 102414335 A | 4/2012 | | |
| CN | 103069040 A | 4/2013 | | |
| CN | 103403210 A | 11/2013 | | |
| EP | 1264911 A2 | 12/2002 | | |
| EP | 2617849 A1 | 7/2013 | | |
| EP | 2738275 A1 | 6/2014 | | |
| EP | 2738276 A1 * | 6/2014 | | C23C 2/06 |
| EP | 2738276 A1 | 6/2014 | | |
| EP | 2762582 A1 | 8/2014 | | |
| EP | 2762585 A1 | 8/2014 | | |
| EP | 2765212 A1 | 8/2014 | | |
| JP | 3231204 B2 | 11/2001 | | |
| JP | 2004218025 A | 8/2004 | | |
| JP | 2008174802 A | 7/2008 | | |
| JP | 2010059452 A | 3/2010 | | |
| JP | 2010065307 A | 3/2010 | | |
| JP | 2010090475 A | 4/2010 | | |
| JP | 2010275627 A | 12/2010 | | |
| JP | 2011032549 A | 2/2011 | | |
| JP | 2011038120 A | 2/2011 | | |
| JP | 2011052271 A | 3/2011 | | |
| JP | 2011093490 A | 5/2011 | | |
| JP | 2011195956 A | 10/2011 | | |
| JP | 2012118040 A | 6/2012 | | |
| JP | 2012153957 A | 8/2012 | | |
| JP | 2012237044 A | 12/2012 | | |
| JP | 2013237917 A | 11/2013 | | |
| WO | 2011090182 A1 | 7/2011 | | |
| WO | 2011093490 A1 | 8/2011 | | |
| WO | WO-2012020511 A1 * | 2/2012 | | C21D 1/25 |
| WO | 2012118040 A1 | 9/2012 | | |
| WO | 2012147898 A1 | 11/2012 | | |
| WO | 2013018741 A1 | 2/2013 | | |
| WO | 2013051238 A1 | 4/2013 | | |
| WO | WO-2013051238 A1 * | 4/2013 | | C21D 8/02 |
| WO | 2014010415 A1 | 1/2014 | | |

OTHER PUBLICATIONS

Aug. 22, 2019, Office Action issued by the United States Patent and Trademark Office in the corresponding U.S. Appl. No. 15/326,811.
Sep. 4, 2019, Office Action issued by the United States Patent and Trademark Office in the corresponding U.S. Appl. No. 15/327,126.

* cited by examiner

HIGH-STRENGTH STEEL SHEET AND PRODUCTION METHOD FOR SAME, AND PRODUCTION METHOD FOR HIGH-STRENGTH GALVANIZED STEEL SHEET

TECHNICAL FIELD

This disclosure relates to a high-strength steel sheet with excellent formability which is mainly suitable for automobile structural members and a method for manufacturing the same, and in particular, to provision of a high-strength steel sheet that has a tensile strength (TS) of 780 MPa or more and that is excellent not only in ductility, but also in fatigue properties, stretch flangeability, surface characteristics, and sheet passage ability.

BACKGROUND

In order to secure passenger safety upon collision and to improve fuel efficiency by reducing the weight of automotive bodies, high-strength steel sheets having a tensile strength (TS) of 780 MPa or more, and reduced in thickness, have been increasingly applied to automobile structural members. Further, in recent years, examination has been made of applications of ultra-high-strength steel sheets with 980 MPa and 1180 MPa grade TS.

In general, however, strengthening of steel sheets leads to deterioration in formability. It is thus difficult to achieve both increased strength and excellent formability. Therefore, it is desirable to develop steel sheets with increased strength and excellent formability.

In addition, strengthening of steel sheets and reducing the thickness significantly deteriorates the shape fixability of the steel sheets. To address this problem, a press mold design is widely used that takes into consideration the amount of geometric change after release from the press mold as predicted at the time of press forming.

However, the amount of geometric change is predicted on the basis of TS, and accordingly increased variation in TS of steel sheets results in the predicted value of geometric change deviating more markedly from the amount of actual geometric change, inducing malformation. Such steel sheets suffering malformation require adjustments after subjection to press forming, such as sheet metal working on individual steel sheets, significantly decreasing mass production efficiency. Accordingly, there is a demand for minimizing variation in TS of steel sheets.

To meet this demand, for example, JP2004218025A (PTL 1) describes a high-strength steel sheet with excellent workability and shape fixability comprising: a chemical composition containing, in mass %, C: 0.06% or more and 0.60% or less, Si+Al: 0.5% or more and 3.0% or less, Mn: 0.5% or more and 3.0% or less, P: 0.15% or less, and S: 0.02% or less; and a microstructure that contains tempered martensite: 15% or more by area to the entire microstructure, ferrite: 5% or more and 60% or less by area to the entire microstructure, and retained austenite: 5% or more by volume to the entire microstructure, and that may contain bainite and/or martensite, wherein a ratio of the retained austenite transforming to martensite upon application of a 2% strain is 20% to 50%.

JP2011195956A (PTL 2) describes a high-strength thin steel sheet with excellent elongation and hole expansion formability, comprising: a chemical composition containing, in mass %, C: 0.05% or more and 0.35% or less, Si: 0.05% or more and 2.0% or less, Mn: 0.8% or more and 3.0% or less, P: 0.0010% or more and 0.1000% or less, S: 0.0005% or more and 0.0500% or less, and Al: 0.01% or more and 2.00% or less, and the balance consisting of iron and incidental impurities; and a metallographic structure that includes a dominant phase of ferrite, bainite, or tempered martensite, and retained austenite in an amount of 3% or more and 30% or less, wherein at a phase interface at which the austenite comes in contact with ferrite, bainite, and martensite, austenite grains that satisfy Cgb/Cgc >1.3 are present in an amount of 50% or more, where Cgc is a central carbon concentration and Cgb is a carbon concentration at grain boundaries of austenite grains.

JP201090475A (PTL 3) describes "a high-strength steel sheet comprising a chemical composition containing, in mass %, C: more than 0.17% and 0.73% or less, Si: 3.0% or less, Mn: 0.5% or more and 3.0% or less, P: 0.1% or less, S: 0.07% or less, Al: 3.0% or less, and N: 0.010% or less, where Si+Al is 0.7% or more, and the balance consisting of Fe and incidental impurities; and a microstructure that contains martensite: 10% or more and 90% or less by area to the entire steel sheet microstructure, retained austenite content: 5% or more and 50% or less, and bainitic ferrite in upper bainite: 5% or more by area to the entire steel sheet microstructure, wherein the steel sheet satisfies conditions that 25% or more of the martensite is tempered martensite, a total of the area ratio of the martensite to the entire steel sheet microstructure, the retained austenite content, and the area ratio of the bainitic ferrite in upper bainite to the entire steel sheet microstructure is 65% or more, and an area ratio of polygonal ferrite to the entire steel sheet microstructure is 10% or less, and wherein the steel sheet has a mean carbon concentration of 0.70% or more in the retained austenite and has a tensile strength (TS) of 980 MPa or more.

JP2008174802A (PTL 4) describes a high-strength cold-rolled steel sheet with a high yield ratio and having a tensile strength of 980 MPa or more, the steel sheet comprising, on average, a chemical composition that contains, by mass %, C: more than 0.06% and 0.24% or less, Si: 0.3% or less, Mn: 0.5% or more and 2.0% or less, P 0.06% or less, S: 0.005% or less, Al: 0.06% or less, N 0.006% or less, Mo: 0.05% or more and 0.50% or less, Ti: 0.03% or more and 0.2% or less, and V: more than 0.15% and 1.2% or less, and the balance consisting of Fe and incidental impurities, wherein the contents of C, Ti, Mo, and V satisfy $0.8 \leq (C/12)/\{(Ti/48)+(Mo/96)+(V/51)\} \leq 1.5$, and wherein an area ratio of ferrite phase is 95% or more, and carbides containing Ti, Mo, and V with a mean grain size of less than 10 nm are diffused and precipitated, where Ti, Mo, and V contents represented by atomic percentage satisfy $V/(Ti+Mo+V) \geq 0.3$.

JP2010275627A (PTL 5) describes a high-strength steel sheet with excellent workability comprising a chemical composition containing, in mass %, C: 0.05% or more and 0.30% or less, Si: 0.01% or more and 2.50% or less, Mn: 0.5% or more and 3.5% or less, P: 0.003% or more and 0.100%, S: 0.02% or less, and Al: 0.010% to 1.500%, where Si+Al: 0.5% to 3.0%, and the balance consisting of Fe and incidental impurities; and a metallic structure that contains, by area, ferrite: 20% or more, tempered martensite: 10% or more and 60% or less, and martensite: 0% to 10%, and that contains, by volume, retained austenite: 3% to 10%, where a ratio m/f of a Vickers hardness (m) of the tempered martensite to a Vickers hardness (f) of the ferrite is 3.0 or less.

JP3231204B (PTL 6) describes a steel sheet with a multi-phase excellent in fatigue properties, the steel sheet comprising a chemical composition containing, in mass %, C: 0.03% or more and 0.15% or less, Si: 0.3% or more and 1.5% or less, Mn: 0.1% or more and 2.0% or less, P: 0.1% or more, Al: 0.005% or more and 0.1% or less, and S: 0.005% or less, and the balance consisting of Fe and incidental impurities; and a tri-phase structure that contains hard, bainite and martensite phases in ferrite phase, wherein the ferrite has a grain size of 4 µm or more and 15 µm or less and a Vickers hardness (Hv) of 140 or more and 180 or less, the bainite has a grain size of 6 µm or less and a Vickers hardness (Hv) of 250 or more and 400 or less, and the martensite has a grain size of 6 µm or less and a Vickers hardness (Hv) of 400 or more and 700 or less, and wherein a volume fraction of the entire hard phase is 5% or more and 40% or less, and the entire hard phase has a mean free path of 20 µm or less.

CITATION LIST

Patent literature

PTL 1: JP2004218025A
PTL 2: JP2011195956A
PTL 3: JP201090475A
PTL 4: JP2008174802A
PTL 5: JP2010275627A
PTL 6: JP3231204B

SUMMARY

Technical Problem

However, although PTL 1 teaches the high-strength steel sheet is excellent in workability and shape fixability, PTL 2 teaches the high-strength thin steel sheet is excellent in elongation and hole expansion formability, and PTL 3 teaches the high-strength steel sheet is excellent in workability, in particular ductility and stretch flangeability, none of these documents consider the stability of the steel sheet as a material, namely variation of TS.

The high-strength cold-rolled steel sheet with a high yield ratio described in PTL 4 uses expensive elements, Mo and V, which results in increased costs. Further, the steel sheet has a low elongation (EL) as low as approximately 19%.

The high-strength steel sheet described in PTL 5 exhibits, for example, TS×EL of approximately 24000 MPa·% with a TS of 980 MPa or more, which remain, although may be relatively high when compared to general-use material, insufficient in terms of elongation (EL) to meet the ongoing requirements for steel sheets.

While PTL 6 teaches a technique for providing excellent fatigue properties, this technique does not make use of retained austenite, and the problem of low EL remains to be solved.

It could thus be helpful to provide a high-strength steel sheet that has a tensile strength (TS) of 780 MPa or more and that is excellent not only in ductility but also in fatigue properties, stretch flangeability, surface characteristics, and sheet passage ability, and a method that can advantageously produce the high-strength steel sheet.

As used herein, "excellent in ductility," or "excellent in EL (total elongation)" means EL ≥34% for TS 780 MPa grade, EL ≥27% for TS 980 MPa grade, and EL ≥23% for TS 1180 MPa grade. As used herein, "excellent in stretch flangeability" (excellent in hole expansion formability: λ) means a case where λ≥40% for TS 780 MPa grade, λ≥30% for TS 980 MPa grade, or λ≥20% for TS 1180 MPa grade, and "excellent in fatigue properties" means a case that satisfies both fatigue limit strength ≥400 MPa and fatigue ratio ≥0.40.

Solution to Problem

As a result of intensive studies made to solve the above problems, we discovered the following.

A slab having an appropriate chemical composition is prepared, heated to a predetermined temperature, and subjected to hot rolling to obtain a hot-rolled sheet. After the hot rolling, the hot-rolled sheet is optionally subjected to heat treatment for softening. The hot-rolled sheet is then subjected to cold rolling, followed by first annealing treatment at an austenite single phase region, and subsequent cooling rate control to suppress ferrite transformation and pearlite transformation.

As a result of the above-described cooling rate control, and before subjection to second annealing, the steel sheet has a steel microstructure in which a single phase of martensite, a single phase of bainite, or a mixed phase of martensite and bainite is dominantly present, and, eventually, the steel microstructure contains proper amounts of fine retained austenite and bainitic ferrite.

Further, the present disclosure intentionally makes use of ferrite that is produced during the second annealing and cooling process to cause fine particle distribution in retained austenite, and keeps the cooling stop temperature after the second annealing low before performing reheating treatment. As a result, tempered martensite is contained in the steel microstructure. In this way, it becomes possible to produce a high-strength steel sheet that has a TS of 780 MPa or more and that is excellent not only in ductility, but also in fatigue properties, stretch flangeability, surface characteristics, and sheet passage ability.

This disclosure has been made based on these discoveries.

Specifically, the primary features of this disclosure are as described below.

1. A high-strength steel sheet comprising: a chemical composition containing (consisting of), in mass %, C: 0.08% or more and 0.35% or less, Si: 0.50% or more and 2.50% or less, Mn: 1.50% or more and 3.00% or less, P: 0.001% or more and 0.100% or less, S: 0.0001% or more and 0.0200% or less, and N: 0.0005% or more and 0.0100% or less, and the balance consisting of Fe and incidental impurities; and a steel microstructure that contains, by area, 20% or more and 50% or less of ferrite, 5% or more and 25% or less of bainitic ferrite, 1% or more and 10% or less of martensite, and 5% or more and 15% or less of tempered martensite, and that contains, by volume, 10% or more of retained austenite, wherein the retained austenite has a mean grain size of 2 µm or less, a mean Mn content in the retained austenite in mass % is at least 1.2 times the Mn content in the steel sheet in mass %, the retained austenite has a mean free path of 1.2 µm or less, and the tempered martensite has a mean free path of 1.2 µm or less.

2. The high-strength steel sheet according to 1., wherein the chemical composition further contains, in mass %, at least one element selected from the group consisting of Al: 0.01% or more and 1.00% or less, Ti: 0.005% or more and 0.100% or less, Nb: 0.005% or more and 0.100% or less, B: 0.0001% or more and 0.0050% or less, Cr: 0.05% or more and 1.00% or less, Cu: 0.05% or more and 1.00% or less, Sb: 0.0020% or more and 0.2000% or less, Sn: 0.0020% or more and 0.2000% or less, Ta: 0.0010% or more and 0.1000% or less, Ca: 0.0003% or more and 0.0050% or less, Mg: 0.0003% or more and 0.0050% or less, and REM: 0.0003% or more and 0.0050% or less.

3. A production method for a high-strength steel sheet, the method comprising: heating a steel slab having the chemical composition as recited in 1. or 2. to 1100° C. or higher and 1300° C. or lower; hot rolling the steel slab with a finisher delivery temperature of 800° C. or higher and 1000° C. or lower to obtain a steel sheet; coiling the steel sheet at a mean coiling temperature of 450° C. or higher and 700° C. or lower; subjecting the steel sheet to pickling treatment; optionally, retaining the steel sheet at a temperature of 450° C. or higher and $Ac_1$ transformation temperature or lower for 900 s or more and 36000 s or less; cold rolling the steel sheet at a rolling reduction of 30% or more; subjecting the steel sheet to first annealing treatment whereby the steel sheet is heated to a temperature of 820° C. or higher and 950° C. or lower; cooling the steel sheet to a first cooling stop temperature at or below Ms at a mean cooling rate to 500° C. of 15° C./s or higher; subjecting the steel sheet to second annealing treatment whereby the steel sheet is reheated to a temperature of 740° C. or higher and 840° C. or lower; cooling the steel sheet to a cooling stop temperature of 150° C. or higher and 350° C. or lower at a cooling rate of 1° C./s or higher and 15° C./s or lower; and reheating the steel sheet to a reheating temperature of higher than 350° C. and 550° C. or lower and retaining the steel sheet at the reheating temperature for 10 s or more, to produce the high-strength steel sheet as recited in 1. or 2.

4. A production method for a high-strength galvanized steel sheet, the method comprising subjecting the high-strength steel sheet as recited in 1. or 2. to galvanizing treatment.

Advantageous Effect

According to the disclosure, it becomes possible to effectively produce a high-strength steel sheet that has a TS of 780 MPa or more, and that is excellent not only in ductility, but also in fatigue properties, stretch flangeability, surface characteristics, and sheet passage ability. Also, a high-strength steel sheet produced by the method according to the disclosure is highly beneficial in industrial terms, because it can improve fuel efficiency when applied to, e.g., automobile structural members by a reduction in the weight of automotive bodies.

DETAILED DESCRIPTION

The following describes one of the embodiments according to the disclosure.
According to the disclosure, a slab is heated to a predetermined temperature and hot-rolled to obtain a hot-rolled sheet. After the hot rolling, optionally, the hot-rolled sheet is subjected to heat treatment for softening. The hot-rolled sheet is then subjected to cold rolling, followed by first annealing treatment at an austenite single phase region, after which cooling rate control is performed to suppress ferrite transformation and pearlite transformation. As a result of the cooling rate control, and before subjection to second annealing, the steel sheet has a steel microstructure in which a single phase of martensite, a single phase of bainite, or a mixed phase of martensite and bainite is dominantly present. Eventually, the steel microstructure contains proper amounts of fine retained austenite and bainitic ferrite. Further, the present disclosure intentionally makes use of ferrite that is produced during the second annealing and cooling process to cause fine particle distribution in retained austenite, and keeps the cooling stop temperature after the second annealing low before performing reheating treatment. As a result, tempered martensite is contained in the steel microstructure. With such structure, it becomes possible to obtain a high-strength steel sheet that has a TS of 780 MPa or more, and that is excellent not only in ductility, but also in fatigue properties, stretch flangeability, surface characteristics, and sheet passage ability.

As used herein, "ferrite" is mainly composed of acicular ferrite when referring to it simply as "ferrite" as in this embodiment, yet may include polygonal ferrite and/or non-recrystallized ferrite. To ensure good ductility, however, the area ratio of non-recrystallized ferrite to said ferrite is preferably limited to 5% or less.

Firstly, the following explains appropriate compositional ranges for steel according to the disclosure and the reasons for the limitations placed thereon.

C: 0.08 Mass % or More and 0.35 Mass % or Less

C is an element that is important for increasing the strength of steel, and has a high solid solution strengthening ability. When martensite is used for structural strengthening, C is essential for adjusting the area ratio and hardness of martensite.

When the C content is below 0.08 mass %, the area ratio of martensite does not increase as required for hardening of martensite, and the steel sheet does not have a sufficient strength. If the C content exceeds 0.35 mass %, however, the steel sheet may be made brittle or susceptible to delayed fracture.

Therefore, the C content is 0.08 mass % or more and 0.35 mass % or less, preferably 0.12 mass % or more and 0.30 mass % or less, and more preferably 0.17 mass % or more and 0.26 mass % or less.

Si: 0.50 Mass % or More and 2.50 Mass % or Less

Si is an element useful for suppressing formation of carbides resulting from decomposition of retained austenite. Si also exhibits a high solid solution strengthening ability in ferrite, and has the property of purifying ferrite by facilitating solute C diffusion from ferrite to austenite to improve the ductility of the steel sheet. Additionally, Si dissolved in ferrite improves strain hardenability and increases the ductility of ferrite itself. To obtain this effect, the Si content needs to be 0.50 mass % or more.

If the Si content exceeds 2.50 mass %, however, an abnormal structure develops, degrading the ductility of the steel sheet and the stability as a material. Therefore, the Si content is 0.50 mass % or more and 2.50 mass % or less, preferably 0.80 mass % or more and 2.00 mass % or less, and more preferably 1.20 mass % or more and 1.80 mass % or less.

Mn: 1.50 Mass % or More and 3.00 Mass % or Less

Mn is effective in guaranteeing the strength of the steel sheet. Mn also improves hardenability to facilitate formation of a multi-phase structure. Furthermore, Mn has the effect of suppressing formation of pearlite and bainite during a cooling process and facilitating austenite to martensite transformation. To obtain this effect, the Mn content needs to be 1.50 mass % or more.

If the Mn content exceeds 3.00 mass %, however, Mn segregation becomes significant in the sheet thickness direction, leading to deterioration of the stability of the steel sheet as a material. Therefore, the Mn content is 1.50 mass % or more and 3.00 mass % or less, preferably 1.50 mass % or more and less than 2.50 mass %, and more preferably 1.80 mass % or more and 2.40 mass % or less.

P: 0.001 Mass % or More and 0.100 Mass % or Less

P is an element that has a solid solution strengthening effect and can be added depending on a desired strength. P also facilitates ferrite transformation, and thus is an element effective in forming a multi-phase structure. To obtain this effect, the P content needs to be 0.001 mass % or more.

If the P content exceeds 0.100 mass %, however, weldability degrades and, when a galvanized layer is subjected to alloying treatment, the alloying rate decreases, impairing galvanizing quality. Therefore, the P content is 0.001 mass % or more and 0.100 mass % or less, and preferably 0.005 mass % or more and 0.050 mass % or less.

S: 0.0001 Mass % or More and 0.0200 Mass % or Less

S segregates to grain boundaries, makes the steel brittle during hot working, and forms sulfides to reduce local deformability. Thus, the S content in steel needs to be 0.0200 mass % or less.

Under manufacturing constraints, however, the S content is necessarily 0.0001 mass % or more. Therefore, the S content is 0.0001 mass % or more and 0.0200 mass % or less, and preferably 0.0001 mass % or more and 0.0050 mass % or less.

N: 0.0005 Mass % or More and 0.0100 Mass % or Less

N is an element that deteriorates the anti-aging property of steel. Smaller N contents are more preferable since deterioration of the anti-aging property becomes more pronounced particularly when the N content exceeds 0.0100 mass %.

Under manufacturing constraints, however, the N content is necessarily 0.0005 mass % or more. Therefore, the N content is 0.0005 mass % or more and 0.0100 mass % or less, and preferably 0.0005 mass % or more and 0.0070 mass % or less.

In addition to the above components, at least one element selected from the group consisting of the following may also be included: Al: 0.01 mass % or more and 1.00 mass % or less, Ti: 0.005 mass % or more and 0.100 mass % or less, Nb: 0.005 mass % or more and 0.100 mass % or less, B: 0.0001 mass % or more and 0.0050 mass % or less, Cr: 0.05 mass % or more and 1.00 mass % or less, Cu: 0.05 mass % or more and 1.00 mass % or less, Sb: 0.0020 mass % or more and 0.2000 mass % or less, Sn: 0.0020 mass % or more and 0.2000 mass % or less, Ta: 0.0010 mass % or more and 0.1000 mass % or less, Ca: 0.0003 mass % or more and 0.0050 mass % or less, Mg: 0.0003 mass % or more and 0.0050 mass % or less, and REM: 0.0003 mass % or more and 0.0050 mass % or less, either alone or in combination. The remainder other than the aforementioned elements, of the chemical composition of the steel sheet, is Fe and incidental impurities.

Al: 0.01 Mass % or More and 1.00 Mass % or Less

Al is an element effective in forming ferrite and improving the balance between strength and ductility. To obtain this effect, the Al content is 0.01 mass % or more. If the Al content exceeds 1.00 mass %, however, surface characteristics deteriorate. Therefore, the Al content is preferably 0.01 mass % or more and 1.00 mass % or less, and more preferably 0.03 mass % or more and 0.50 mass % or less.

Ti and Nb each form fine precipitates during hot rolling or annealing and increase strength. To obtain this effect, the Ti and Nb contents each need to be 0.005 mass % or more. If the Ti and Nb contents both exceed 0.100 mass %, formability deteriorates. Therefore, when Ti and Nb are added to steel, respective contents are 0.005 mass % or more and 0.100 mass % or less.

B is an element effective in increasing the strength of steel, and this effect is obtained when the B content is 0.0001 mass % or more. However, excessively adding B beyond 0.0050 mass % unduly increases the area ratio of martensite, raising a concern that ductility might decrease due to a significant rise in strength. Therefore, the B content is 0.0001 mass % or more and 0.0050 mass % or less, and preferably 0.0005 mass % or more and 0.0030 mass % or less.

Cr and Cu not only serve as solid-solution-strengthening elements, but also act to stabilize austenite in a cooling process during annealing, facilitating formation of a multi-phase structure. To obtain this effect, the Cr and Cu contents each need to be 0.05 mass % or more. If the Cr and Cu contents both exceed 1.00 mass %, the formability of the steel sheet degrade. Therefore, when Cr and Cu are added to steel, respective contents are 0.05 mass % or more and 1.00 mass % or less.

Sb and Sn may be added as necessary for suppressing decarbonization of a region extending from the surface layer of the steel sheet to a depth of about several tens of micrometers, which is caused by nitriding and/or oxidation of the steel sheet surface. Suppressing such nitriding or oxidation is effective in preventing a reduction in the amount of martensite formed in the steel sheet surface, and guaranteeing the strength of the steel sheet and the stability as a material. However, excessively adding these elements beyond 0.2000 mass % reduces toughness. Therefore, when Sb and Sn are added to steel, respective contents are 0.0020 mass % or more and 0.2000 mass % or less.

As is the case with Ti and Nb, Ta forms alloy carbides or alloy carbonitrides, and contributes to increasing the strength of steel. It is also believed that Ta has the effect of significantly suppressing coarsening of precipitates when partially dissolved in Nb carbides or Nb carbonitrides to form complex precipitates, such as (Nb, Ta) (C, N), and providing a stable contribution to increasing the strength of the steel sheet through strengthening by precipitation. Therefore, Ta is preferably added to steel.

The above-described precipitate stabilizing effect is obtained when the Ta content is 0.0010 mass % or more. However, excessively adding Ta does not increase this effect, but instead the alloying cost ends up increasing. Therefore, when Ta is added to steel, the content thereof is in a range of 0.0010 mass % to 0.1000 mass %.

Ca, Mg, and REM are elements used for deoxidation. These elements are also effective in causing spheroidization of sulfides and mitigating the adverse effect of sulfides on local ductility and stretch flangeability. To obtain this effect, Ca, Mg, and REM each need to be added to steel in an amount of 0.0003 mass % or more. However, excessively adding Ca, Mg, and REM beyond 0.0050 mass % leads to increased inclusions and the like, causing defects on the steel sheet surface and internal defects.

Therefore, when Ca, Mg, and REM are added to steel, respective contents are 0.0003 mass % or more and 0.0050 mass % or less.

The following provides a description of the microstructure.

Area Ratio of Ferrite: 20% or More and 50% or Less

This is one of the very important controllable factors for the disclosure. The high-strength steel sheet according to the disclosure comprises a multi-phase structure in which retained austenite having an influence mainly on ductility and martensite affecting strength are diffused in soft ferrite with high ductility. Additionally, to ensure sufficient ductility and balance strength and ductility, the area ratio of ferrite that is produced during the second annealing and cooling process needs to be 20% or more. On the other hand, to ensure the strength of the steel sheet, the area ratio of ferrite needs to be 50% or less.

Area Ratio of Bainitic Ferrite: 5% or More and 25% or Less

Bainitic ferrite forms adjacent to ferrite and retained austenite. Bainitic ferrite has the effect of reducing the difference in hardness between the ferrite and the retained austenite to suppress the occurrence of fatigue cracking and propagation of cracking, and may thus ensure good fatigue properties. To obtain this effect, the area ratio of bainitic ferrite needs to be 5% or more. On the other hand, to ensure the strength of the steel sheet, the area ratio of bainitic ferrite needs to be 25% or less.

As used herein, the term "bainitic ferrite" means such ferrite that is produced during the process of annealing at a temperature range of 740° C. to 840° C., followed by cooling to and retaining at a temperature of 600° C. or lower, and that has a high dislocation density as compared to normal ferrite.

In addition, "the area ratio of ferrite and bainitic ferrite" is calculated with the following method. Firstly, polish a cross section of the steel sheet taken in the sheet thickness direction to be parallel to the rolling direction (L-cross section), etch the cross section with 3 vol. % nital, and observe ten locations at 2000 times magnification under an SEM (scanning electron microscope) at a position of sheet thickness×¼ (a position at a depth of one-fourth of the sheet thickness from the steel sheet surface). Then, using the structure micrographs imaged with the SEM, calculate the area ratios of respective phases (ferrite and bainitic ferrite) for the ten locations with Image-Pro, available from Media Cybernetics, Inc. Then, average the results, and use the average as "the area ratio of ferrite and bainitic ferrite." In the structure micrographs, ferrite and bainitic ferrite appear as a gray structure (base steel structure), while retained austenite and martensite as a white structure.

Identification of ferrite and bainitic ferrite is made by EBSD (Electron Backscatter Diffraction) measurement. A crystal grain (phase) that includes a sub-boundary with a grain boundary angle of smaller than 15° is identified as bainitic ferrite, for which the area ratio is calculated and the result is used as the area ratio of bainitic ferrite. The area ratio of ferrite is calculated by subtracting the area ratio of bainitic ferrite from the area ratio of the above-described gray structure.

Area Ratio of Martensite: 1% or More and 10% or Less

According to the disclosure, to ensure the strength of the steel sheet, the area ratio of martensite needs to be 1% or more. On the other hand, to ensure the steel sheet has good ductility and hole expansion formability (stretch flangeability), the area ratio of martensite needs to be 10% or less. For obtaining better ductility and stretch flangeability, the area ratio of martensite is preferably 8% or less. As used herein, the area ratio of martensite does not include the area ratio of tempered martensite.

Note that "the area ratio of martensite" is calculated with the following method. Firstly, polish an L-cross section of the steel sheet, etch the L-cross section with 3 vol. % nital, and observe ten locations at 2000 times magnification under an SEM at a position of sheet thickness×¼ (a position at a depth of one-fourth of the sheet thickness from the steel sheet surface). Then, using the structure micrographs imaged with the SEM, calculate the total area ratio of martensite and retained austenite, both appearing white, for the ten locations with Image-Pro described above. Then, average the results, subtract the area ratio of retained austenite from the average, and use the result as "the area ratio of martensite." In the structure micrographs, martensite and retained austenite appear as a white structure. As used herein, as the area ratio of retained austenite, the volume fraction of retained austenite described below is used.

Area Ratio of Tempered Martensite: 5% or More and 15% or Less

To ensure good hole expansion formability (stretch flangeability), the area ratio of tempered martensite needs to be 5% or more. For obtaining better hole expansion formability (stretch flangeability), it is preferred that the area ratio of tempered martensite is 8% or more. On the other hand, to ensure the strength of the steel sheet, the area ratio of tempered martensite needs to be 15% or less.

As used herein, as the area ratio of retained austenite, the volume fraction of retained austenite described below is used. In addition, tempered martensite can be identified by determining whether cementite or retained austenite is included in martensite. The area ratio of tempered martensite can be determined with the following method. First, polish an L-cross section of the steel sheet, etch the cross section with 3 vol. % nital, and observe ten locations at 2000 times magnification under an SEM (scanning electron microscope) at a position of sheet thickness×¼ (a position at a depth of one-fourth of the sheet thickness from the steel sheet surface). Then, using the structure micrographs imaged with the SEM, calculate the area ratios for the ten locations with Image-Pro described above, average the results, and use the average as the area ratio of tempered martensite.

Volume Fraction of Retained Austenite: 10% or More

According to the disclosure, to ensure good ductility and balance strength and ductility, the volume fraction of retained austenite needs to be 10% or more. For obtaining better ductility and achieving a better balance between strength and ductility, it is preferred that the volume fraction of retained austenite is 12% or more.

The volume fraction of retained austenite is calculated by determining the x-ray diffraction intensity of a plane of sheet thickness×¼, which is exposed by polishing the steel sheet surface to a depth of one-fourth of the sheet thickness. Using an incident x-ray beam of MoKα, the intensity ratio of the peak integrated intensity of the $\{111\}$, $\{200\}$, $\{220\}$, and $\{311\}$ planes of retained austenite to the peak integrated intensity of the $\{110\}$, $\{200\}$, and $\{211\}$ planes of ferrite is calculated for all of the twelve combinations, the results are averaged, and the average is used as the volume fraction of retained austenite.

Mean Grain Size of Retained Austenite: 2 μm or Less

Refinement of retained austenite grains contributes to improving the ductility of the steel sheet and the stability as a material. Accordingly, to ensure good ductility of the steel sheet and stability as a material, the mean grain size of retained austenite needs to be 2 μm or less. For obtaining better ductility and stability as a material, the mean grain size of retained austenite is preferably 1.5 μm or less.

As used herein, "the mean grain size of retained austenite" is calculated with the following method. First, observe twenty locations at 15000 times magnification under a TEM (transmission electron microscope), and image structure micrographs. Then, calculate equivalent circular diameters from the areas of retained austenite grains identified with Image-Pro as mentioned above in the structure micrographs for the twenty locations, average the results, and use the average as "the mean grain size of retained austenite." For the above-described observation, the steel sheet was cut from both front and back surfaces up to 0.3 mm thick, so that the central portion in the sheet thickness direction of the steel sheet is located at a position of sheet thickness×¼. Then, electropolishing was performed on the front and back surfaces to form a hole, and a portion reduced in sheet thickness around the hole was observed under the TEM in the sheet surface direction.

The Mean Mn Content in Retained Austenite (in Mass %) is at Least 1.2 Times the Mn Content in the Steel Sheet (in Mass %).

This is one of the very important controllable factors for the disclosure.

The reason is as follows. When the mean Mn content in retained austenite (in mass %) is at least 1.2 times the Mn content in the steel sheet (in mass %), and when a single phase of martensite, a single phase of bainite, or a mixed phase of martensite and bainite is dominantly present in the structure prior to second annealing, carbides with Mn concentrated therein precipitate in the first place when raising the temperature during second annealing. Then, the carbides act as nuclei for austenite through reverse transformation, and eventually fine retained austenite is uniformly distributed in the structure, improving the stability of the steel sheet as a material.

The mean Mn content (in mass %) of each phase was calculated by analysis with FE-EPMA (Field Emission-Electron Probe Micro Analyzer).

No upper limit is particularly placed on the mean Mn content in retained austenite (in mass %) as long as the mean Mn content in retained austenite is at least 1.2 times the Mn content in the steel sheet (in mass %). However, it is preferred that the mean Mn content in retained austenite is about 2.5 times the Mn content in the steel sheet, in mass %.

Mean Free Path of Retained Austenite: 1.2 μm or Less

This is one of the very important controllable factors for the disclosure. According to the disclosure, the occurrence of fatigue cracking and propagation of cracking can be suppressed by causing fine particle distribution in retained austenite. To ensure good fatigue properties and the like, however, the mean free path ($L_{RA}$) of retained austenite needs to be 1.2 μm or less.

No lower limit is particularly placed on the mean free path of retained austenite, yet the lower limit is preferably about 0.1 μm.

The mean free path ($L_{RA}$) of retained austenite is calculated by Expression 1 shown below.

$$L_{RA} = \frac{d_{RA}}{2}\left(\frac{4\pi}{3f}\right)^{\frac{1}{3}} - d_{RA} \qquad \text{Expression 1}$$

$L_{RA}$: mean free path of retained austenite (μm)
$d_{RA}$: mean grain size of retained austenite (μm)
f: area ratio of retained austenite (%)÷100

Mean Free Path of Tempered Martensite: 1.2 μm or Less

This is one of the very important controllable factors for the disclosure. This is because the occurrence of fatigue cracking and propagation of cracking can be suppressed by causing fine particle distribution in tempered martensite. To this end, the mean free path of tempered martensite needs to be 1.2 μm or less.

No lower limit is particularly placed on the mean free path of tempered martensite, yet the lower limit is preferably about 0.1 μm.

The mean free path ($L_{TM}$) of tempered martensite is calculated by Expression 2 shown below.

$$L_{TM} = \frac{d_{TM}}{2}\left(\frac{4\pi}{3f}\right)^{\frac{1}{3}} - d_{TM} \qquad \text{Expression 2}$$

$L_{TM}$: mean free path of tempered martensite (μm)
$d_{TM}$: mean grain size of tempered martensite (μm)
f: area ratio of tempered martensite (%)÷100

The mean grain size of tempered martensite can be determined with the following method. First, polish an L-cross section of the steel sheet, etch the cross section with 3 vol. % nital, and observe ten locations at 2000 times magnification under an SEM at a position of sheet thickness×¼. Then, calculate equivalent circular diameters from the areas of tempered martensite grains identified with Image-Pro as mentioned above in the structure micrographs, average the results, and use the average as the mean grain size of tempered martensite.

In addition to ferrite, bainitic ferrite, martensite, and retained austenite, the microstructure according to the disclosure may include carbides such as tempered martensite, pearlite, cementite, and the like, or other phases well known as steel sheet microstructure constituents. Any of the other phases, such as tempered martensite, may be included as long as the area ratio is 10% or less, without detracting from the effect of the disclosure.

The following provides a description of the production method according to the disclosure.

To produce the high-strength steel sheet disclosed herein, a steel slab having the above-described predetermined chemical composition is heated to 1100° C. or higher and 1300° C. or lower, and hot rolled with a finisher delivery temperature of 800° C. or higher and 1000° C. or lower to obtain a steel sheet. Then, the steel sheet is coiled at a mean coiling temperature of 450° C. or higher and 700° C. or lower, subjected to pickling treatment, and, optionally, retained at a temperature of 450° C. or higher and $Ac_1$ transformation temperature or lower for 900 s or more and 36000 s or less. Then, the steel sheet is cold rolled at a rolling reduction of 30% or more, and subjected to first annealing treatment whereby the steel sheet is heated to a temperature of 820° C. or higher and 950° C. or lower.

Then, the steel sheet is cooled to a first cooling stop temperature at or below Ms at a mean cooling rate to 500° C. of 15° C./s or higher, and subsequently subjected to second annealing treatment at a temperature range of 740° C. to 840° C.

Further, according to the disclosure, the steel sheet is cooled to a second cooling stop temperature of 150° C. or higher and 350° C. or lower at a cooling rate of 1° C./s or higher and 15° C./s or lower, then reheated to a reheating temperature of higher than 350° C. and 550° C. or lower, and retained at the reheating temperature for 10 s or more.

The high-strength galvanized steel sheet disclosed herein may be produced by performing well-known and widely-used galvanizing treatment on the above-mentioned high tensile strength steel sheet.

Steel Slab Heating Temperature: 1100° C. or Higher and 1300° C. or Lower

Precipitates that are present at the time of heating of a steel slab will remain as coarse precipitates in the resulting steel sheet, making no contribution to strength. Thus, remelting of any Ti- and Nb-based precipitates precipitated during casting is required.

In this respect, if a steel slab is heated at a temperature below 1100° C., it is difficult to cause sufficient melting of carbides, leading to problems such as an increased risk of trouble during hot rolling resulting from increased rolling load. In addition, for obtaining a smooth steel sheet surface, it is necessary to scale-off defects on the surface layer of the slab, such as blow hole generation, segregation, and the like, and to reduce cracks and irregularities on the steel sheet surface. Therefore, according to the disclosure, the steel slab heating temperature needs to be 1100° C. or higher. If the steel slab heating temperature exceeds 1300° C., however, scale loss increases as oxidation progresses. Accordingly, the steel slab heating temperature needs to be 1300° C. or lower. As such, the slab heating temperature is 1100° C. or higher and 1300° C. or lower, and preferably 1150° C. or higher and 1250° C. or lower.

A steel slab is preferably made with continuous casting to prevent macro segregation, yet may be produced with other methods such as ingot casting or thin slab casting. The steel slab thus produced may be cooled to room temperature and then heated again according to the conventional method. Alternatively, there can be employed without problems what is called "energy-saving" processes, such as hot direct rolling or direct rolling in which either a warm steel slab without being fully cooled to room temperature is charged into a heating furnace, or a steel slab undergoes heat retaining for a short period and immediately hot rolled. Further, a steel slab is subjected to rough rolling under normal conditions and formed into a sheet bar. When the heating temperature is low, the sheet bar is preferably heated using a bar heater or the like prior to finish rolling from the viewpoint of preventing troubles during hot rolling.

Finisher Delivery Temperature in Hot Rolling: 800° C. or Higher and 1000° C. or Lower The heated steel slab is hot rolled through rough rolling and finish rolling to form a hot-rolled steel sheet. At this point, when the finisher delivery temperature exceeds 1000° C., the amount of oxides (scales) generated suddenly increases and the interface between the steel substrate and oxides becomes rough, which tends to impair the surface quality after pickling and cold rolling. In addition, any hot-rolling scales remaining after pickling adversely affect ductility and stretch flangeability. Moreover, a grain size is excessively coarsened, causing surface deterioration in a pressed part during working.

On the other hand, if the finisher delivery temperature is below 800° C., rolling load and burden increase, rolling is performed more often in a state in which recrystallization of austenite does not occur, an abnormal texture develops, and the final product has a significant planar anisotropy. As a result, not only do the material properties become less uniform and less stable, but the ductility itself also deteriorates.

Therefore, the finisher delivery temperature in hot rolling needs to be in a range of 800° C. to 1000° C., and preferably in a range of 820° C. to 950° C.

Mean Coiling Temperature After Hot Rolling: 450° C. or Higher and 700° C. or Lower When the mean coiling temperature at which the steel sheet is coiled after the hot rolling is above 700° C., the grain size of ferrite in the structure of the hot-rolled sheet increases, making it difficult to ensure a desired strength of the final-annealed sheet. On the other hand, when the mean coiling temperature after the hot rolling is below 450° C., there is an increase in the strength of the hot-rolled sheet and in the rolling load in cold rolling, degrading productivity. A mean coiling temperature below 450° C. causes martensite in the structure of the hot-rolled sheet. When such a hard hot-rolled sheet with a martensite-dominant structure is subjected to cold rolling, minute internal cracking (brittle cracking) easily occurs along prior austenite grain boundaries in martensite, degrading the ductility of the final-annealed sheet. Therefore, the mean coiling temperature after the hot rolling needs to be 450° C. or higher and 700° C. or lower, and preferably 450° C. or higher and 650° C. or lower.

Finish rolling may be performed continuously by joining rough-rolled sheets during the hot rolling. Rough-rolled sheets may be coiled on a temporary basis. At least part of finish rolling may be conducted as lubrication rolling to reduce rolling load in the hot rolling. Conducting lubrication rolling in such a manner is effective from the perspective of making the shape and material properties of the steel sheet uniform. In lubrication rolling, the coefficient of friction is preferably in a range of 0.10 to 0.25.

The hot-rolled steel sheet thus produced is subjected to pickling. Pickling enables removal of oxides from the steel sheet surface, and is thus important to ensure that the high-strength steel sheet as the final product has good chemical convertibility and a sufficient quality of coating. Pickling may be performed in one or more batches.

Heat Treatment Temperature and Holding Time for the Hot-rolled Sheet After the Pickling Treatment: Retained at 450° C. or Higher and $Ac_1$ Transformation Temperature or Lower for 900 s or More and 36000 s or Less When the heat treatment temperature is below 450° C., or when the heat treatment holding time is shorter than 900 s, tempering after the hot rolling is insufficient, causing a mixed phase of ferrite, bainite, and martensite in the structure of the steel sheet, and making the structure less uniform. Additionally, under the influence of the structure of the hot-rolled sheet, uniform refinement of the steel sheet structure becomes insufficient. This results in an increase in the proportion of coarse martensite in the structure of the final-annealed sheet, and thus increases the non-uniformity of the structure, which may degrade the final-annealed sheet in terms of hole expansion formability (stretch flangeability) and stability as a material.

On the other hand, a heat treatment holding time longer than 36000 s may adversely affect productivity. In addition, a heat treatment temperature above $Ac_1$ transformation temperature provides a non-uniform, hardened, and coarse dual-phase structure of ferrite and either martensite or pearlite, increasing the non-uniformity of the structure of the steel sheet before subjection to cold rolling, and resulting in an increase in the proportion of coarse martensite in the final-annealed sheet, which may also degrade the final-annealed sheet in terms of hole expansion formability (stretch flangeability) and stability as a material.

Therefore, for the hot-rolled sheet after subjection to the pickling treatment, the heat treatment temperature needs to be 450° C. or higher and $Ac_1$ transformation temperature or lower, and the holding time needs to be 900 s or more and 36000 s or less.

Rolling Reduction During Cold Rolling: 30% or More

When the rolling reduction is below 30%, the number of grain boundaries that act as nuclei for reverse transformation to austenite and the total number of dislocations per unit area decrease during the subsequent annealing, making it difficult to obtain the above-described resulting microstructure. In addition, if the microstructure becomes non-uniform, the ductility of the steel sheet decreases.

Therefore, the rolling reduction during cold rolling needs to be 30% or more, and is preferably 40% or more. The effect of the disclosure can be obtained without limiting the number of rolling passes or the rolling reduction for each pass. No upper limit is particularly placed on the rolling reduction, yet a practical upper limit is about 80% in industrial terms.

First Annealing Treatment Temperature: 820° C. or Higher 950° C. or Lower

If the first annealing temperature is below 820° C., then the heat treatment is performed at a ferrite-austenite dual phase region, with the result that a large amount of ferrite (polygonal ferrite) produced at the ferrite-austenite dual phase region will be included in the resulting structure. As a result, a desired amount of fine retained austenite cannot be produced, making it difficult to balance good strength and ductility. On the other hand, when the first annealing temperature exceeds 950° C., austenite grains are coarsened during the annealing and fine retained austenite cannot be produced eventually, again, making it difficult to balance good strength and ductility. As a result, productivity decreases.

Without limitation, the holding time during the first annealing treatment is preferably 10 s or more and 1000 s or less.

Mean Cooling Rate to 500° C. After the First Annealing Treatment: 15° C./s or Higher When the mean cooling rate to 500° C. after the first annealing treatment is below 15° C./s, ferrite and pearlite are produced during the cooling, preventing formation of a single phase of martensite, a single phase of bainite, or a mixed phase of martensite and bainite in the structure of the steel sheet before subjection to second annealing. As a result, a desired amount of fine retained austenite cannot be produced eventually, making it difficult to balance good strength and ductility. This also reduces the stability of the steel sheet as a material. No upper limit is particularly placed on the mean cooling rate, yet in industrial terms, the mean cooling rate is practically up to about 80° C./s.

Cooling to a First Cooling Stop Temperature at or Below Ms

In the first annealing treatment, the steel sheet is ultimately cooled to a first cooling stop temperature at or below Ms.

This setup is for the purpose of causing a single phase of martensite, a single phase of bainite, or a mixed phase of martensite and bainite to be dominantly present in the structure of the steel sheet before subjection to second annealing treatment. As a result, during the cooling and retaining process after second annealing, non-polygonal ferrite and bainitic ferrite are produced in large amounts with distorted grain boundaries produced at 600° C. or lower. Consequently, it becomes possible to obtain proper amounts of fine retained austenite, and yield good ductility.

Second Annealing Treatment Temperature: 740° C. or Higher and 840° C. or Lower

A second annealing temperature below 740° C. cannot ensure formation of a sufficient volume fraction of austenite during the annealing, and eventually formation of a desired area ratio of martensite and of a desired volume fraction of retained austenite. Accordingly, it becomes difficult to ensure strength and to balance good strength and ductility. On the other hand, a second annealing temperature above 840° C. is within a temperature range of austenite single phase, and a desired amount of fine retained austenite cannot be produced in the end. As a result, this makes it difficult again to ensure good ductility and to balance strength and ductility. Moreover, unlike the case where heat treatment is performed at a ferrite-austenite dual phase region, distribution of Mn resulting from diffusion hardly occurs. As a result, the mean Mn content in retained austenite (mass %) does not increase to at least 1.2 times the Mn content in the steel sheet (in mass %), making it difficult to obtain a desired volume fraction of stable retained austenite. Without limitation, the holding time during the second annealing treatment is preferably 10 s or more and 1000 s or less.

Mean Cooling Rate to a Second Cooling Stop Temperature of 150° C. or Higher and 350° C. or Lower: 1° C./s or Higher and 15° C./s or Lower When the mean cooling rate to a second cooling stop temperature of 150° C. or higher and 350° C. or lower after the second annealing treatment is lower than 1° C./s, a large amount of ferrite forms during cooling, making it difficult to ensure the formation of bainite and martensite and to guarantee the strength of the steel sheet. On the other hand, when the mean cooling rate to the second cooling stop temperature is higher than 15° C./s, a sufficient amount of ferrite cannot be produced during cooling, degrading the ductility of the steel sheet, the balance between strength and ductility, and fatigue properties. In this case, preferable cooling is furnace cooling or gas cooling.

In addition, if the cooling stop temperature is above 350° C., it is higher than the martensite transformation starting temperature (Ms), with the result that tempered martensite is not produced, hard and fresh martensite remains in the resulting structure, and hole expansion formability (stretch flangeability) ends up deteriorating. On the other hand, if the cooling stop temperature is below 150° C., austenite transforms to martensite in a large amount, and a desired volume fraction of retained austenite cannot be obtained in the end, making it difficult to obtain good ductility and to balance strength and ductility.

Holding Time at a Reheating Temperature of Higher than 350° C. and 550° C. or Lower: 10 s or More According to the disclosure, the steel sheet is cooled to a cooling stop temperature of 150° C. or higher and 350° C. or lower, and then reheated to a reheating temperature of higher than 350° C. and 550° C. or lower.

If the reheating temperature is 350° C. or lower, a desired area ratio of tempered martensite cannot be obtained, making it difficult to ensure good hole expansion formability (stretch flangeability). On the other hand, if the reheating temperature is higher than 550° C., austenite decomposes into a mix of ferrite and cementite or into pearlite, and a desired amount of retained austenite cannot be obtained in the end, making it difficult to ensure good ductility. Therefore, the reheating temperature is higher than 350° C. and 550° C. or lower.

If the holding time at the reheating temperature is shorter than 10 s, there is insufficient time for the concentration of C (carbon) into austenite to progress, making it difficult to ensure a desired volume fraction of retained austenite in the end. Therefore, the holding time at the reheating temperature is 10 s or more. However, a holding time longer than 600 s does not increase the volume fraction of retained austenite and ductility does not improve significantly, where the effect reaches a plateau. Therefore, the holding time is preferably 600 s or less.

Cooling after the holding is not particularly limited, and any method may be used to implement cooling to a desired temperature. The desired temperature is preferably around room temperature.

Galvanizing Treatment

When hot-dip galvanizing treatment is performed, the steel sheet subjected to the above-described annealing treatment is immersed in a galvanizing bath at 440° C. or higher and 500° C. or lower for hot-dip galvanizing, after which coating weight adjustment is performed using gas wiping or the like. For hot-dip galvanizing, a galvanizing bath with an Al content of 0.10 mass % or more and 0.22 mass % or less is preferably used. When a galvanized layer is subjected to alloying treatment, the alloying treatment is performed in a temperature range of 470° C. to 600° C. after the hot-dip galvanizing treatment. If the alloying treatment is performed at a temperature above 600° C., untransformed austenite transforms to pearlite, where the presence of a desired volume fraction of retained austenite cannot be ensured and ductility may degrade. Therefore, when a galvanized layer is subjected to alloying treatment, the alloying treatment is preferably performed in a temperature range of 470° C. to 600° C. Electrogalvanized plating may also be performed.

When skin pass rolling is performed after the heat treatment, the skin pass rolling is preferably performed with a rolling reduction of 0.1% or more and 1.0% or less. A rolling reduction below 0.1% provides only a small effect and complicates control, and hence 0.1% is the lower limit of the favorable range. On the other hand, a rolling reduction above 1.0% significantly degrades productivity, and thus 1.0% is the upper limit of the favorable range.

The skin pass rolling may be performed on-line or off-line. Skin pass may be performed in one or more batches with a target rolling reduction. No particular limitations are placed on other manufacturing conditions, yet from the perspective of productivity, the aforementioned series of processes such as annealing, hot-dip galvanizing, and alloying treatment on a galvanized layer are preferably carried out on a CGL (Continuous Galvanizing Line) as the hot-dip galvanizing line. After the hot-dip galvanizing, wiping may be performed for adjusting the coating amounts. Conditions other than the above, such as coating conditions, may be determined in accordance with conventional hot-dip galvanizing methods.

EXAMPLES

Steels having the chemical compositions presented in Table 1, each with the balance consisting of Fe and incidental impurities, were prepared by steelmaking in a converter and formed into slabs by continuous casting. The steel slabs thus obtained were heated under the conditions presented in Table 2, and subjected to hot rolling to obtain steel sheets. The steel sheets were then subjected to pickling treatment. Then, for Steel Nos. 1-19, 21, 22, 25, 27, 29, 31, 32, 34-39, 41, and 43-55 presented in Table 2, heat treatment was performed on the hot-rolled sheets. Out of these, for Steel Nos. 31, 32, 34-39, 41, and 43, the steel sheets were further subjected to pickling treatment after subjection to the heat treatment.

Then, cold rolling was performed under the conditions presented in Table 2. Subsequently, annealing treatment was conducted twice under the conditions in Table 2 to produce high-strength cold-rolled steel sheets (CR).

Moreover, some of the high-strength cold-rolled steel sheets (CR) were subjected to galvanizing treatment to obtain hot-dip galvanized steel sheets (GI), galvannealed steel sheets (GA), electrogalvanized steel sheets (EG), and so on. Used as hot-dip galvanizing baths were a zinc bath containing 0.19 mass % of Al for GI and a zinc bath containing 0.14 mass % of Al for GA, in each case the bath temperature was 465° C. The coating weight per side was 45 g/m² (in the case of both-sided coating), and the Fe concentration in the coated layer of each hot-dip galvannealed steel sheet (GA) was 9 mass % or more and 12 mass % or less.

The $Ac_1$ transformation temperature (° C.) was calculated by:

$$Ac_1 \text{ transformation temperature (° C.)}=751-16\times(\% C)+11\times(\% Si)-28\times(\% Mn)-5.5\times(\% Cu)+13\times(\% Cr)$$

Where (% X) represents content (in mass %) of an element X in steel.

Ms (° C.) was calculated by:

$$Ms \text{ (° C.)}=550-361\times(\% C)\times0.01\times[\text{fraction of } A \text{ (\%)}\\ \text{immediately after annealing in second annealing}\\ \text{treatment}]-69\times[\text{Mn content in retained austenite}\\ (\%)]-20\times(\% Cr)-10\times(\% Cu)+30\times(\% Al)$$

Where (% X) represents content (in mass %) of an element X in steel.

Here, "fraction of A (%) immediately after annealing in second annealing treatment" is the area ratio of martensite in the structure of the steel sheet subjected to water quenching (mean cooling rate to room temperature: 800° C./s or higher) immediately after subjection to annealing in second annealing treatment (temperature range: 740° C. to 840° C.). The area ratio of martensite can be calculated with the above-described method.

In the above expression, "Mn content in retained austenite (%)" is the mean Mn content in retained austenite (mass %) of the resulting high-strength steel sheet.

TABLE 1

| Steel ID | Chemical composition (mass %) | | | | | | | | | | | | | | | | | | | Ac₁ transformation temperature (° C.) | Remarks |
|---|---|---|---|---|---|---|---|---|---|---|---|---|---|---|---|---|---|---|---|---|---|
| | C | Si | Mn | P | S | N | Al | Ti | Nb | B | Cr | Cu | Sb | Sn | Ta | Ca | Mg | REM | | |
| A | 0.211 | 1.44 | 2.32 | 0.018 | 0.0022 | 0.0034 | — | — | — | — | — | — | — | — | — | — | — | — | 699 | Disclosed Steel |
| B | 0.185 | 1.25 | 2.14 | 0.017 | 0.0021 | 0.0031 | — | — | — | — | — | — | — | — | — | — | — | — | 702 | Disclosed Steel |
| C | 0.212 | 1.27 | 2.02 | 0.016 | 0.0018 | 0.0029 | — | — | — | — | — | — | — | — | — | — | — | — | 705 | Disclosed Steel |
| D | 0.232 | 0.75 | 2.31 | 0.022 | 0.0024 | 0.0028 | — | — | — | — | — | — | — | — | — | — | — | — | 691 | Disclosed Steel |
| E | 0.226 | 1.04 | 2.03 | 0.027 | 0.0018 | 0.0031 | — | — | — | — | — | — | — | — | — | — | — | — | 702 | Disclosed Steel |
| F | 0.213 | 1.44 | 1.90 | 0.014 | 0.0021 | 0.0034 | — | — | — | — | — | — | — | — | — | — | — | — | 710 | Disclosed Steel |
| G | 0.222 | 1.52 | 2.16 | 0.018 | 0.0018 | 0.0031 | — | — | — | — | — | — | — | — | — | — | — | — | 704 | Disclosed Steel |
| H | 0.201 | 1.49 | 2.31 | 0.021 | 0.0023 | 0.0030 | — | — | — | — | — | — | — | — | — | — | — | — | 699 | Disclosed Steel |
| I | 0.186 | 1.34 | 2.81 | 0.029 | 0.0021 | 0.0029 | — | — | — | — | — | — | — | — | — | — | — | — | 684 | Disclosed Steel |
| J | 0.062 | 1.51 | 2.82 | 0.025 | 0.0023 | 0.0029 | — | — | — | — | — | — | — | — | — | — | — | — | 688 | Comparative Steel |
| K | 0.238 | 0.21 | 2.67 | 0.025 | 0.0024 | 0.0031 | — | — | — | — | — | — | — | — | — | — | — | — | 675 | Comparative Steel |
| L | 0.216 | 1.45 | 1.33 | 0.024 | 0.0026 | 0.0032 | — | — | — | — | — | — | — | — | — | — | — | — | 715 | Comparative Steel |
| M | 0.185 | 1.21 | 3.28 | 0.021 | 0.0024 | 0.0034 | — | — | — | — | — | — | — | — | — | — | — | — | 670 | Comparative Steel |
| N | 0.204 | 1.37 | 2.2 | 0.019 | 0.0023 | 0.0035 | 0.390 | — | — | — | — | — | — | — | — | — | — | — | 701 | Disclosed Steel |
| O | 0.199 | 1.23 | 1.96 | 0.029 | 0.0023 | 0.0029 | — | 0.042 | — | — | — | — | — | — | — | — | — | — | 706 | Disclosed Steel |
| P | 0.182 | 1.26 | 1.82 | 0.018 | 0.0024 | 0.0031 | — | — | 0.047 | — | — | — | — | — | — | — | — | — | 711 | Disclosed Steel |
| Q | 0.195 | 1.09 | 2.31 | 0.022 | 0.0019 | 0.0038 | — | — | — | 0.0018 | — | — | — | — | — | — | — | — | 695 | Disclosed Steel |
| R | 0.233 | 1.41 | 1.92 | 0.028 | 0.0014 | 0.0029 | — | — | — | — | 0.28 | — | — | — | — | — | — | — | 713 | Disclosed Steel |
| S | 0.202 | 1.42 | 2.14 | 0.018 | 0.0023 | 0.0032 | — | — | — | — | — | 0.21 | — | — | — | — | — | — | 702 | Disclosed Steel |
| T | 0.223 | 1.48 | 2.16 | 0.022 | 0.0021 | 0.0031 | — | — | — | — | — | — | 0.0052 | — | — | — | — | — | 703 | Disclosed Steel |
| U | 0.189 | 1.52 | 1.93 | 0.018 | 0.0029 | 0.0031 | — | — | — | — | — | — | — | 0.0042 | — | — | — | — | 711 | Disclosed Steel |
| V | 0.182 | 1.46 | 2.01 | 0.027 | 0.0019 | 0.0032 | — | — | — | — | — | — | 0.0058 | — | — | — | — | — | 708 | Disclosed Steel |
| W | 0.198 | 1.38 | 2.02 | 0.025 | 0.0014 | 0.0041 | — | — | 0.044 | — | — | — | — | — | — | — | — | — | 706 | Disclosed Steel |
| X | 0.204 | 1.42 | 2.09 | 0.019 | 0.0024 | 0.0034 | — | — | 0.021 | — | — | — | — | — | 0.0041 | — | — | — | 705 | Disclosed Steel |
| Y | 0.213 | 1.41 | 1.87 | 0.026 | 0.0022 | 0.0041 | — | — | 0.035 | — | — | — | — | 0.0061 | — | — | — | — | 711 | Disclosed Steel |
| Z | 0.214 | 1.21 | 1.91 | 0.022 | 0.0025 | 0.0042 | — | — | — | — | — | — | — | — | 0.0058 | — | — | — | 707 | Disclosed Steel |
| AA | 0.199 | 1.44 | 2.19 | 0.026 | 0.0026 | 0.0038 | — | — | — | — | — | — | — | — | — | 0.0026 | — | — | 702 | Disclosed Steel |
| AB | 0.195 | 1.61 | 2.06 | 0.021 | 0.0021 | 0.0034 | — | — | — | — | — | — | — | — | — | — | 0.0018 | — | 708 | Disclosed Steel |
| AC | 0.090 | 1.30 | 1.82 | 0.013 | 0.0032 | 0.0034 | — | — | — | — | — | — | — | — | — | — | — | 0.0024 | 713 | Disclosed Steel |
| AD | 0.083 | 1.49 | 2.95 | 0.012 | 0.0028 | 0.0047 | — | — | — | — | — | — | — | — | — | — | — | — | 683 | Disclosed Steel |
| AE | 0.089 | 0.82 | 1.76 | 0.022 | 0.0053 | 0.0041 | — | — | — | — | — | — | — | — | — | — | — | — | 709 | Disclosed Steel |
| AF | 0.095 | 0.93 | 2.79 | 0.024 | 0.0034 | 0.0039 | — | — | — | — | — | — | — | — | — | — | — | — | 682 | Disclosed Steel |
| AG | 0.086 | 2.31 | 2.87 | 0.024 | 0.0050 | 0.0044 | — | — | — | — | — | — | — | — | — | — | — | — | 695 | Disclosed Steel |
| AH | 0.309 | 1.25 | 1.73 | 0.011 | 0.0028 | 0.0053 | — | — | — | — | — | — | — | — | — | — | — | — | 711 | Disclosed Steel |
| AI | 0.293 | 1.34 | 2.34 | 0.014 | 0.0026 | 0.0036 | — | — | — | — | — | — | — | — | — | — | — | — | 696 | Disclosed Steel |
| AJ | 0.287 | 1.36 | 2.84 | 0.022 | 0.0015 | 0.0039 | — | — | — | — | — | — | — | — | — | — | — | — | 682 | Disclosed Steel |
| AK | 0.123 | 1.32 | 2.31 | 0.019 | 0.0019 | 0.0035 | — | 0.055 | — | — | — | — | — | — | — | — | — | — | 699 | Disclosed Steel |
| AL | 0.178 | 1.45 | 2.58 | 0.005 | 0.0029 | 0.0042 | — | — | — | — | — | — | — | — | — | — | — | — | 692 | Disclosed Steel |
| AM | 0.191 | 1.38 | 2.77 | 0.016 | 0.0006 | 0.0029 | — | — | — | — | — | — | — | — | — | — | — | — | 686 | Disclosed Steel |
| AN | 0.218 | 1.39 | 2.25 | 0.008 | 0.0006 | 0.0032 | — | — | — | — | — | — | — | — | — | — | — | — | 700 | Disclosed Steel |

Underlined if outside of the disclosed range.

TABLE 2

| | | Hot-rolling treatment | | | Heat treatment on hot-rolled sheet | | Rolling reduction in cold rolling (%) | First annealing treatment | | | | Second annealing treatment | | | | | | |
|---|---|---|---|---|---|---|---|---|---|---|---|---|---|---|---|---|---|---|
| No. | Steel ID | Slab heating temp. (°C) | Finisher delivery temp. (°C) | Mean coiling temp. (°C) | Heat treatment temp. (°C) | Heat treatment time (s) | | Annealing temp. (°C) | Mean cooling rate (°C/s) | Cooling stop temp. (°C) | | Annealing temp. (°C) | Mean cooling rate (°C/s) | Cooling stop temp. (°C) | Reheating holding temp. (°C) | Reheating holding time (s) | Type* | Remarks |
| 1 | A | 1230 | 900 | 550 | 550 | 22000 | 57.6 | 910 | 18 | 230 | | 790 | 7 | 210 | 430 | 300 | CR | Example |
| 2 | B | 1250 | 910 | 570 | 510 | 10000 | 54.8 | 890 | 19 | 250 | | 810 | 8 | 200 | 440 | 200 | GI | Example |
| 3 | C | 1200 | 890 | 510 | 500 | 22000 | 52.9 | 880 | 17 | 250 | | 830 | 6 | 220 | 460 | 180 | GA | Example |
| 4 | C | 1230 | 700 | 510 | 540 | 20000 | 47.1 | 910 | 16 | 280 | | 790 | 7 | 200 | 450 | 200 | CR | Comparative Example |
| 5 | C | 1230 | 890 | 310 | 530 | 23000 | 60.0 | 890 | 17 | 280 | | 780 | 8 | 220 | 460 | 180 | GI | Comparative Example |
| 6 | C | 1260 | 860 | 800 | 550 | 7000 | 56.5 | 910 | 16 | 290 | | 780 | 6 | 240 | 470 | 300 | CR | Comparative Example |
| 7 | C | 1230 | 900 | 610 | 540 | 19000 | 18.2 | 880 | 18 | 280 | | 830 | 7 | 240 | 510 | 290 | CR | Comparative Example |
| 8 | C | 1220 | 910 | 590 | 520 | 16000 | 56.3 | 880 | 19 | 280 | | 760 | 6 | 220 | 420 | 150 | EG | Comparative Example |
| 9 | C | 1210 | 860 | 530 | 500 | 20000 | 62.5 | 740 | 19 | 300 | | 780 | 10 | 200 | 420 | 240 | CR | Comparative Example |
| 10 | C | 1260 | 880 | 580 | 500 | 6000 | 57.1 | 1020 | 19 | 290 | | 780 | 9 | 210 | 430 | 260 | CR | Comparative Example |
| 11 | C | 1210 | 880 | 550 | 520 | 20000 | 51.7 | 910 | 17 | 300 | | 670 | 5 | 230 | 450 | 210 | CR | Comparative Example |
| 12 | C | 1230 | 900 | 560 | 580 | 26000 | 58.8 | 920 | 16 | 270 | | 920 | 9 | 220 | 400 | 180 | CR | Comparative Example |
| 13 | C | 1220 | 890 | 550 | 550 | 20000 | 58.8 | 900 | 20 | 275 | | 810 | 55 | 50 | 450 | 200 | CR | Comparative Example |
| 14 | C | 1240 | 900 | 540 | 540 | 18000 | 58.8 | 910 | 18 | 280 | | 800 | 6 | 500 | 470 | 200 | CR | Comparative Example |
| 15 | C | 1260 | 890 | 540 | 560 | 9000 | 57.1 | 920 | 18 | 275 | | 810 | 8 | 210 | 270 | 180 | GI | Comparative Example |
| 16 | C | 1250 | 870 | 550 | 560 | 18000 | 58.8 | 870 | 17 | 275 | | 820 | 5 | 220 | 640 | 210 | CR | Comparative Example |
| 17 | C | 1260 | 880 | 510 | 550 | 23000 | 58.8 | 860 | 15 | 275 | | 780 | 12 | 240 | 430 | 4 | GA | Comparative Example |
| 18 | C | 1280 | 900 | 520 | 550 | 21000 | 64.3 | 880 | 16 | 270 | | 780 | 10 | 200 | 410 | 1000 | GI | Comparative Example |
| 19 | C | 1240 | 890 | 590 | 550 | 23000 | 52.9 | 870 | 17 | 220 | | 810 | 7 | 230 | 470 | 250 | CR | Example |
| 20 | D | 1260 | 890 | 550 | — | — | 48.6 | 870 | 18 | 230 | | 800 | 9 | 240 | 430 | 310 | CR | Example |
| 21 | E | 1240 | 920 | 630 | 530 | 21000 | 46.2 | 880 | 17 | 230 | | 790 | 7 | 200 | 410 | 280 | GA | Example |
| 22 | F | 1240 | 880 | 590 | 530 | 22000 | 47.8 | 900 | 17 | 250 | | 770 | 4 | 200 | 390 | 200 | GI | Example |
| 23 | G | 1230 | 850 | 580 | — | — | 50.0 | 910 | 19 | 250 | | 810 | 5 | 220 | 490 | 500 | EG | Example |
| 24 | H | 1240 | 870 | 570 | — | — | 56.3 | 920 | 20 | 200 | | 800 | 7 | 240 | 380 | 180 | CR | Example |
| 25 | I | 1250 | 850 | 570 | 580 | 20000 | 62.5 | 890 | 19 | 240 | | 820 | 5 | 200 | 410 | 190 | CR | Comparative Example |
| 26 | J | 1210 | 870 | 580 | — | — | 58.8 | 860 | 19 | 200 | | 810 | 7 | 210 | 410 | 460 | EG | Example |
| 27 | K | 1240 | 850 | 570 | 560 | 21000 | 56.3 | 930 | 15 | 340 | | 820 | 10 | 220 | 400 | 240 | CR | Comparative Example |
| 28 | L | 1250 | 880 | 560 | — | — | 62.5 | 910 | 16 | 120 | | 790 | 9 | 170 | 430 | 300 | EG | Example |
| 29 | M | 1270 | 910 | 540 | 550 | 6000 | 64.7 | 890 | 17 | 240 | | 810 | 8 | 220 | 480 | 500 | GI | Example |
| 30 | N | 1220 | 900 | 510 | — | — | 50.0 | 900 | 15 | 260 | | 800 | 6 | 230 | 490 | 220 | CR | Example |
| 31 | O | 1230 | 890 | 500 | 550 | 18000 | 46.2 | 910 | 16 | 260 | | 780 | 9 | 190 | 500 | 160 | GA | Example |
| 32 | P | 1260 | 860 | 560 | 530 | 16000 | 53.3 | 900 | 19 | 200 | | 810 | 8 | 210 | 420 | 200 | CR | Example |
| 33 | Q | 1230 | 890 | 560 | 500 | 23000 | 52.9 | 880 | 18 | 220 | | 760 | 10 | 200 | 410 | 320 | CR | Example |
| 34 | R | 1260 | 880 | 570 | 540 | 8000 | 47.1 | 920 | 17 | 240 | | 770 | 11 | 220 | 450 | 220 | EG | Example |
| 35 | S | 1270 | 890 | 560 | 500 | 20000 | 55.6 | 910 | 18 | 250 | | 810 | 12 | 200 | 480 | 240 | CR | Example |
| 36 | T | 1240 | 880 | 560 | 510 | 20000 | 56.3 | 900 | 19 | 270 | | 820 | 10 | 200 | 480 | 400 | GI | Example |
| 37 | U | 1250 | 860 | 560 | 540 | 15000 | 58.8 | 910 | 19 | 260 | | 820 | 9 | 210 | 410 | 150 | EG | Example |
| 38 | V | 1250 | 850 | 520 | 530 | 13000 | 64.3 | 920 | 20 | 230 | | 800 | 6 | 220 | 430 | 340 | GI | Example |
| 39 | W | 1240 | 920 | 520 | 490 | 10000 | 62.5 | 910 | 17 | 240 | | 810 | 6 | 200 | 460 | 260 | EG | Example |
| 40 | X | 1230 | 910 | 490 | — | — | 56.3 | 890 | 17 | 280 | | 780 | 5 | 220 | 470 | 350 | CR | Example |
| 41 | Y | 1250 | 890 | 590 | 510 | 9000 | 53.8 | 900 | 16 | 270 | | 800 | 7 | 240 | 460 | 300 | GA | Example |
| 42 | Z/AA | 1260 | 900 | 520 | — | — | 56.3 | 910 | 15 | 250 | | 770 | 6 | 230 | 430 | 490 | GI | Example |

TABLE 2-continued

| | | Hot-rolling treatment | | | Heat treatment on hot-rolled sheet | | Rolling reduction in cold rolling (%) | First annealing treatment | | | | Second annealing treatment | | | Reheating | | | |
|---|---|---|---|---|---|---|---|---|---|---|---|---|---|---|---|---|---|---|
| No. | Steel ID | Slab heating temp. (° C.) | Finisher delivery temp. (° C.) | Mean coiling temp. (° C.) | Heat treatment temp. (° C.) | Heat treatment time (s) | | Annealing temp. (° C.) | Mean cooling rate (° C./s) | Cooling stop temp. (° C.) | Annealing temp. (° C.) | Mean cooling rate (° C./s) | Cooling stop temp. (° C.) | Reheating holding temp. (° C.) | Reheating holding time (s) | Type* | Remarks |
| 43 | AB | 1260 | 860 | 530 | 570 | 6000 | 60.0 | 920 | 16 | 270 | 810 | 4 | 240 | 410 | 220 | CR | Example |
| 44 | AC | 1200 | 890 | 590 | 630 | 25000 | 56.5 | 890 | 19 | 45 | 770 | 8 | 200 | 440 | 15000 | CR | Example |
| 45 | AD | 1210 | 850 | 620 | 620 | 13000 | 56.3 | 860 | 18 | 70 | 810 | 7 | 250 | 380 | 19000 | CR | Example |
| 46 | AE | 1230 | 870 | 490 | 590 | 14000 | 42.9 | 830 | 22 | 40 | 820 | 5 | 180 | — | — | GA | Example |
| 47 | AF | 1240 | 900 | 590 | 510 | 30000 | 52.0 | 930 | 21 | 35 | 810 | 7 | 300 | — | — | GI | Example |
| 48 | AG | 1240 | 880 | 550 | 570 | 26000 | 52.4 | 880 | 21 | 120 | 780 | 7 | 200 | — | — | CR | Example |
| 49 | AH | 1230 | 840 | 620 | 600 | 22000 | 58.6 | 900 | 19 | 25 | 790 | 5 | 230 | 450 | 22000 | GI | Example |
| 50 | AI | 1250 | 850 | 590 | 570 | 13000 | 37.8 | 910 | 22 | 50 | 810 | 6 | 240 | — | — | EG | Example |
| 51 | AJ | 1260 | 920 | 510 | 610 | 15000 | 40.7 | 840 | 24 | 35 | 760 | 9 | 250 | — | — | CR | Example |
| 52 | AK | 1210 | 880 | 490 | 530 | 23000 | 50.0 | 900 | 28 | 110 | 810 | 10 | 200 | 430 | 27000 | GA | Example |
| 53 | AL | 1230 | 860 | 600 | 570 | 27000 | 45.5 | 870 | 18 | 140 | 800 | 9 | 180 | — | — | CR | Example |
| 54 | AM | 1210 | 850 | 560 | 550 | 20000 | 61.1 | 860 | 25 | 55 | 760 | 10 | 270 | 410 | 20000 | CR | Example |
| 55 | AN | 1200 | 920 | 550 | 610 | 18000 | 57.9 | 880 | 19 | 40 | 800 | 7 | 250 | — | — | GA | Example |

Underlined if outside of the disclosed range.
*CR: cold-rolled steel sheets (uncoated), GI: hot-dip galvanized steel sheets (alloying treatment not performed on galvanized layers), GA: galvannealed steel sheets, EG: electrogalvanized steel sheets The obtained steel sheets, such as high-strength cold-rolled steel sheets (CR), hot-dip galvanized steel sheets (GI), galvannealed steel sheets (GA), electrogalvanized steel sheet (EG), and the like, were subjected to tensile test and fatigue test.

Tensile test was performed in accordance with JIS Z 2241 (2011) to measure TS (tensile strength) and EL (total elongation), using JIS No. 5 test pieces that were sampled such that the longitudinal direction of each test piece coincides with a direction perpendicular to the rolling direction of the steel sheet (the C direction). In this case, TS and EL were determined to be good when EL ≥34% for TS 780 MPa grade, EL ≥27% for TS 980 MPa grade, and EL ≥23% for TS 1180 MPa grade, and TS×EL ≥27000 MPa·%.

Hole expansion test was performed in accordance with JIS Z 2256 (2010). Each of the steel sheets thus obtained was cut to a sample size of 100 mm×100 mm, and a hole with a diameter of 10 mm was drilled through each sample with clearance 12%±1%. Subsequently, each steel sheet was clamped into a die having an inner diameter of 75 mm with a blank holding force of 8 tons (7.845 kN). In this state, a conical punch of 60° was pushed into the hole, the hole diameter at crack initiation limit was measured, and the maximum hole expansion ratio λ (%) was calculated by the following equation to evaluate hole expansion formability:

$$\text{maximum hole expansion ratio } \lambda\ (\%) = \{(D_f - D_0)/D_0\} \times 100$$

Where $D_f$ is a hole diameter at the time of occurrence of cracking (mm) and $D_0$ is an initial hole diameter (mm).

In this case, the hole expansion formability was determined to be good when λ≥40% for TS 780 MPa grade, λ≥30% for TS 980 MPa grade, and λ≥20% for TS 1180 MPa grade.

In fatigue test, sampling was performed such that the longitudinal direction of each fatigue test piece coincides with a direction perpendicular to the rolling direction of the steel sheet, and plane bending fatigue test was conducted under the completely reversed (stress ratio: −1) condition and at the frequency of 20 Hz in accordance with JIS Z 2275 (1978). In the completely reversed plane bending fatigue test, the stress at which no fracture was observed after $10^7$ cycles was measured and used as fatigue limit strength. Fatigue limit strength was divided by tensile strength TS to calculate a fatigue ratio. In this case, the fatigue property was determined to be good when fatigue limit strength ≥400 MPa and fatigue ratio 0.40.

The sheet passage ability during hot rolling was determined to be low when the risk of trouble during hot rolling increased with increasing rolling load.

The sheet passage ability during cold rolling was determined to be low when the risk of trouble during cold rolling increased with increasing rolling load.

The surface characteristics of each final-annealed sheet were determined to be poor when defects such as blow hole generation and segregation on the surface layer of the slab could not be scaled-off, cracks and irregularities on the steel sheet surface increased, and a smooth steel sheet surface could not be obtained. The surface characteristics were also determined to be poor when the amount of oxides (scales) generated suddenly increased, the interface between the steel substrate and oxides was roughened, and the surface quality after pickling and cold rolling degraded, or when some hot-rolling scales remained after pickling.

Productivity was evaluated according to the lead time costs, including: (1) malformation of a hot-rolled sheet occurred; (2) a hot-rolled sheet requires straightening before proceeding to the subsequent steps; (3) a prolonged annealing treatment holding time; and (4) a prolonged austemper holding time (a prolonged holding time at a reheating temperature range after the second annealing treatment). The productivity was determined to be "high" when none of (1) to (4) applied, "middle" when only (4) applied, and "low" when any of (1) to (3) applied.

The above-described evaluation results are shown in Table 3.

TABLE 3

| No. | Steel ID | Sheet thickness (mm) | Sheet passage ability during hot rolling | Sheet passage ability during cold rolling | Surface characteristics of cold-rolled steel sheet | Productivity | Area ratio of F (%) | Area ratio of BF (%) | Area ratio of M (%) | Area ratio of TM (%) | Volume fraction of RA (%) | Mean grain size of RA (μm) | Mn content in RA (mass %) | Mn content in steel sheet (mass %) |
|---|---|---|---|---|---|---|---|---|---|---|---|---|---|---|
| 1 | A | 1.4 | High | High | Good | High | 45.6 | 20.6 | 2.8 | 11.4 | 12.4 | 0.9 | 3.14 | 2.32 |
| 2 | B | 1.4 | High | High | Good | High | 39.5 | 17.4 | 5.2 | 11.2 | 19.8 | 1.0 | 2.78 | 2.14 |
| 3 | C | 1.6 | High | High | Good | High | 39.8 | 16.6 | 6.4 | 12.6 | 20.3 | 0.7 | 2.77 | 2.02 |
| 4 | C | 1.8 | Low | Low | Poor | Low | 39.8 | 23.4 | 8.9 | 12.4 | 7.9 | 0.7 | 2.46 | 2.02 |
| 5 | C | 1.2 | High | Low | Good | Low | 44.8 | 18.5 | 12.3 | 10.8 | 12.5 | 1.4 | 2.46 | 2.02 |
| 6 | C | 1.0 | High | High | Good | High | 60.8 | 22.9 | 2.9 | 7.6 | 3.8 | 0.6 | 2.48 | 2.02 |
| 7 | C | 1.8 | High | High | Good | High | 42.1 | 20.1 | 7.5 | 11.8 | 8.1 | 2.8 | 2.45 | 2.02 |
| 8 | C | 1.4 | High | High | Good | High | 58.4 | 8.9 | 8.9 | 13.2 | 5.2 | 3.1 | 2.46 | 2.02 |
| 9 | C | 1.2 | High | High | Good | Low | 43.6 | 20.4 | 4.8 | 10.8 | 10.9 | 0.9 | 2.24 | 2.02 |
| 10 | C | 1.2 | High | High | Good | High | 71.4 | 10.4 | 2.5 | 2.9 | 3.1 | 0.4 | 2.46 | 2.02 |
| 11 | C | 1.4 | High | High | Good | High | 42.9 | 22.1 | 8.9 | 18.5 | 4.4 | 3.0 | 2.21 | 2.02 |
| 12 | C | 1.4 | High | High | Good | High | 39.8 | 16.4 | 7.6 | 19.5 | 13.2 | 1.5 | 2.49 | 2.02 |
| 13 | C | 1.4 | High | High | Good | High | 40.9 | 10.8 | 0.5 | 38.9 | 1.6 | 0.4 | 2.47 | 2.02 |
| 14 | C | 1.4 | High | High | Good | High | 48.2 | 22.6 | 6.1 | 3.2 | 12.2 | 0.8 | 2.51 | 2.02 |
| 15 | C | 1.2 | High | High | Good | High | 41.9 | 10.4 | 0.7 | 37.8 | 2.4 | 0.5 | 2.47 | 2.02 |
| 16 | C | 1.4 | High | High | Good | High | 47.2 | 4.5 | 26.2 | 10.6 | 4.2 | 0.4 | 2.45 | 2.02 |
| 17 | C | 1.4 | High | High | Good | High | 48.1 | 3.9 | 22.4 | 13.4 | 3.9 | 0.6 | 2.49 | 2.02 |
| 18 | C | 1.0 | High | High | Good | Middle | 42.8 | 20.4 | 8.2 | 12.5 | 11.2 | 1.1 | 2.51 | 2.02 |
| 19 | D | 1.6 | High | High | Good | High | 39.8 | 15.5 | 8.1 | 13.3 | 21.9 | 1.2 | 2.91 | 2.31 |
| 20 | E | 1.8 | High | High | Good | High | 45.8 | 14.8 | 7.2 | 10.3 | 18.8 | 1.1 | 2.59 | 2.03 |
| 21 | F | 1.4 | High | High | Good | High | 45.4 | 13.9 | 6.8 | 11.0 | 19.2 | 1.0 | 2.56 | 1.90 |
| 22 | G | 1.2 | High | High | Good | High | 46.9 | 15.4 | 6.4 | 7.6 | 21.6 | 0.7 | 2.65 | 2.16 |
| 23 | H | 1.2 | High | High | Good | High | 44.9 | 16.5 | 7.6 | 10.6 | 19.4 | 0.9 | 2.87 | 2.31 |

TABLE 3-continued

| No. | Steel | | | | | | | | | | | | | |
|---|---|---|---|---|---|---|---|---|---|---|---|---|---|---|
| 24 | I | 1.4 | High | High | Good | High | 32.2 | 15.6 | 9.2 | 14.2 | 25.8 | 0.8 | 3.52 | 2.81 |
| 25 | J | 1.2 | High | High | Good | High | 67.8 | 19.7 | 0.9 | 4.6 | 2.4 | 0.5 | 3.46 | 2.82 |
| 26 | K | 1.4 | High | High | Good | High | 41.2 | 4.2 | 23.2 | 20.4 | 3.1 | 0.7 | 3.26 | 2.67 |
| 27 | L | 1.4 | High | High | Good | High | 71.8 | 18.4 | 0.2 | 1.4 | 0.8 | 1.94 | 1.73 | |
| 28 | M | 1.2 | High | High | Good | High | 40.1 | 2.4 | 19.8 | 22.4 | 13.4 | 0.9 | 4.35 | 3.28 |
| 29 | N | 1.2 | High | High | Good | High | 40.2 | 19.1 | 5.5 | 10.5 | 20.2 | 0.8 | 2.98 | 2.20 |
| 30 | O | 1.4 | High | High | Good | High | 39.5 | 17.8 | 6.6 | 11.6 | 21.5 | 0.7 | 2.55 | 1.96 |
| 31 | P | 1.4 | High | High | Good | High | 41.4 | 16.8 | 4.4 | 19.0 | 19.7 | 0.9 | 2.45 | 1.82 |
| 32 | Q | 1.4 | High | High | Good | High | 38.2 | 15.9 | 5.4 | 11.2 | 21.1 | 0.8 | 3.21 | 2.31 |
| 33 | R | 1.6 | High | High | Good | High | 38.2 | 16.7 | 7.0 | 12.4 | 20.0 | 1.1 | 2.59 | 1.92 |
| 34 | S | 1.8 | High | High | Good | High | 40.8 | 18.3 | 4.0 | 11.4 | 19.4 | 0.7 | 2.68 | 2.14 |
| 35 | T | 1.6 | High | High | Good | High | 45.4 | 18.5 | 2.6 | 10.6 | 15.7 | 0.7 | 2.72 | 2.16 |
| 36 | U | 1.4 | High | High | Good | High | 42.1 | 18.8 | 2.7 | 11.2 | 18.7 | 0.6 | 2.58 | 1.93 |
| 37 | V | 1.4 | High | High | Good | High | 41.3 | 17.8 | 3.6 | 12.1 | 20.0 | 0.9 | 2.58 | 2.01 |
| 38 | W | 1.0 | High | High | Good | High | 40.1 | 17.4 | 5.2 | 10.2 | 21.1 | 0.8 | 2.78 | 2.02 |
| 39 | X | 1.2 | High | High | Good | High | 36.7 | 17.6 | 5.8 | 10.8 | 22.7 | 0.7 | 2.84 | 2.09 |
| 40 | Y | 1.4 | High | High | Good | High | 42.1 | 16.7 | 3.3 | 10.5 | 19.5 | 0.9 | 2.39 | 1.87 |
| 41 | Z | 1.2 | High | High | Good | High | 39.8 | 16.6 | 4.0 | 11.2 | 20.6 | 1.1 | 2.54 | 1.91 |
| 42 | AA | 1.4 | High | High | Good | High | 40.1 | 17.5 | 2.9 | 12.1 | 20.8 | 0.7 | 2.78 | 2.19 |
| 43 | AB | 1.2 | High | High | Good | High | 41.1 | 18.0 | 2.9 | 10.9 | 20.8 | 0.9 | 2.58 | 2.06 |
| 44 | AC | 1.0 | High | High | Good | High | 48.5 | 23.2 | 3.1 | 10.2 | 14.1 | 1.1 | 2.89 | 1.82 |
| 45 | AD | 1.4 | High | High | Good | High | 43.2 | 23.4 | 3.3 | 10.5 | 15.9 | 0.9 | 4.88 | 2.95 |
| 46 | AE | 1.6 | High | High | Good | High | 48.5 | 24.1 | 4.0 | 11.2 | 11.1 | 1.0 | 2.92 | 1.76 |
| 47 | AF | 1.2 | High | High | Good | High | 43.1 | 20.9 | 2.6 | 12.8 | 13.8 | 0.9 | 4.68 | 2.79 |
| 48 | AG | 2.0 | High | High | Good | High | 40.8 | 22.3 | 3.9 | 12.2 | 16.8 | 0.7 | 4.55 | 2.87 |
| 49 | AH | 1.2 | High | High | Good | High | 45.0 | 20.8 | 4.0 | 9.9 | 19.5 | 0.8 | 2.68 | 1.73 |
| 50 | AI | 2.3 | High | High | Good | High | 40.8 | 23.2 | 2.7 | 10.4 | 22.2 | 0.6 | 3.45 | 2.34 |
| 51 | AJ | 1.6 | High | High | Good | High | 39.5 | 23.0 | 3.7 | 11.2 | 22.2 | 0.8 | 4.81 | 2.84 |
| 52 | AK | 1.8 | High | High | Good | High | 43.1 | 22.3 | 4.1 | 12.2 | 17.9 | 1.0 | 3.93 | 2.31 |
| 53 | AL | 1.2 | High | High | Good | High | 43.2 | 20.0 | 3.3 | 10.2 | 20.8 | 0.8 | 4.12 | 2.58 |
| 54 | AM | 1.4 | High | High | Good | High | 42.6 | 20.9 | 3.8 | 10.9 | 21.2 | 0.9 | 4.40 | 2.77 |
| 55 | AN | 1.6 | High | High | Good | High | 43.9 | 19.1 | 2.8 | 11.1 | 22.1 | 0.7 | 3.92 | 2.25 |

| | Microstructure | | | | | | | | | | | |
|---|---|---|---|---|---|---|---|---|---|---|---|---|
| No. | Mn content in RA/Mn content in steel sheet | Mean free path of RA (μm) | Mean free path of TM (μm) | Balance structure | TS (MPa) | EL (%) | λ (%) | TS × EL (MPa · %) | Fatigue limit strength (MPa) | Fatigue ratio | Fraction of A* (%) | Ms (° C.) | Remarks |
| 1 | 1.35 | 0.7 | 0.8 | P + θ | 797 | 38.8 | 62 | 30924 | 410 | 0.51 | 56.6 | 290 | Example |
| 2 | 1.30 | 0.8 | 0.7 | P + θ | 991 | 32.4 | 42 | 32108 | 460 | 0.46 | 66.2 | 314 | Example |
| 3 | 1.37 | 0.9 | 0.6 | P + θ | 1029 | 32.8 | 40 | 33751 | 470 | 0.46 | 69.3 | 306 | Example |
| 4 | 1.22 | 0.7 | 0.8 | P + θ | 1189 | 12.4 | 15 | 14744 | 500 | 0.42 | 59.2 | 335 | Comparative Example |
| 5 | 1.22 | 0.7 | 0.7 | P + θ | 930 | 22.4 | 40 | 20832 | 400 | 0.43 | 62.6 | 332 | Comparative Example |
| 6 | 1.23 | 0.8 | 1.0 | P + θ | 685 | 30.2 | 42 | 20687 | 280 | 0.41 | 44.3 | 345 | Comparative Example |
| 7 | 1.21 | 1.0 | 1.1 | P + θ | 1049 | 14.8 | 31 | 15525 | 430 | 0.41 | 57.4 | 337 | Comparative Example |
| 8 | 1.22 | 1.8 | 1.7 | P + θ | 1221 | 15.9 | 10 | 19414 | 400 | 0.33 | 57.3 | 336 | Comparative Example |
| 9 | 1.11 | 1.0 | 0.9 | P + θ | 1036 | 17.8 | 31 | 18441 | 420 | 0.41 | 56.5 | 352 | Comparative Example |
| 10 | 1.22 | 1.0 | 1.1 | P + θ | 681 | 26.5 | 43 | 18047 | 280 | 0.41 | 38.5 | 351 | Comparative Example |
| 11 | 1.09 | 0.9 | 1.0 | P + θ | 1089 | 17.5 | 41 | 19058 | 450 | 0.41 | 61.8 | 350 | Comparative Example |
| 12 | 1.23 | 1.8 | 1.9 | P + θ | 1187 | 15.4 | 17 | 18280 | 430 | 0.36 | 70.3 | 324 | Comparative Example |
| 13 | 1.22 | 1.1 | 0.7 | P + θ | 702 | 26.5 | 54 | 18603 | 290 | 0.41 | 71.0 | 325 | Comparative Example |
| 14 | 1.24 | 0.7 | 1.2 | P + θ | 1028 | 28.1 | 26 | 28887 | 470 | 0.46 | 51.5 | 337 | Comparative Example |
| 15 | 1.22 | 1.1 | 0.6 | P + θ | 702 | 26.5 | 53 | 18603 | 290 | 0.41 | 70.9 | 325 | Comparative Example |
| 16 | 1.21 | 1.0 | 1.4 | P + θ | 1190 | 15.5 | 21 | 18445 | 490 | 0.41 | 71.0 | 327 | Comparative Example |
| 17 | 1.23 | 1.0 | 0.9 | P + θ | 1197 | 14.2 | 22 | 16997 | 500 | 0.42 | 69.7 | 325 | Comparative Example |
| 18 | 1.24 | 0.9 | 0.9 | P + θ | 1041 | 28.9 | 33 | 30085 | 450 | 0.43 | 61.9 | 329 | Example |
| 19 | 1.26 | 0.8 | 0.5 | P + θ | 1120 | 30.1 | 34 | 33712 | 510 | 0.46 | 73.3 | 288 | Example |
| 20 | 1.28 | 0.6 | 0.6 | P + θ | 1012 | 34.1 | 38 | 34509 | 450 | 0.44 | 66.3 | 317 | Example |
| 21 | 1.35 | 0.5 | 0.8 | P + θ | 1035 | 31.2 | 40 | 32292 | 480 | 0.46 | 67.0 | 322 | Example |
| 22 | 1.23 | 0.6 | 0.8 | P + θ | 987 | 34.5 | 35 | 34052 | 470 | 0.48 | 65.6 | 315 | Example |
| 23 | 1.24 | 0.5 | 0.6 | P + θ | 989 | 34.2 | 36 | 33824 | 470 | 0.48 | 67.6 | 303 | Example |
| 24 | 1.25 | 0.9 | 0.6 | P + θ | 1204 | 28.1 | 29 | 33832 | 520 | 0.43 | 79.2 | 254 | Example |
| 25 | 1.23 | 0.9 | 0.9 | P + θ | 697 | 26.2 | 73 | 18261 | 290 | 0.42 | 37.9 | 303 | Comparative Example |
| 26 | 1.22 | 1.0 | 0.9 | P + θ | 1231 | 11.2 | 18 | 13787 | 510 | 0.41 | 76.7 | 259 | Comparative Example |
| 27 | 1.12 | 1.1 | 1.0 | P + θ | 681 | 26.8 | 42 | 18251 | 280 | 0.41 | 32.4 | 391 | Comparative Example |
| 28 | 1.33 | 1.1 | 0.9 | P + θ | 1042 | 29.6 | 26 | 30843 | 440 | 0.42 | 85.6 | 193 | Comparative Example |
| 29 | 1.35 | 0.9 | 0.7 | P + θ | 1055 | 30.9 | 38 | 32600 | 460 | 0.44 | 66.2 | 307 | Example |
| 30 | 1.30 | 0.7 | 0.6 | P + θ | 1058 | 29.7 | 37 | 31423 | 490 | 0.46 | 69.7 | 324 | Example |
| 31 | 1.35 | 0.5 | 0.5 | P + θ | 1006 | 34.3 | 42 | 34506 | 470 | 0.47 | 65.0 | 338 | Example |
| 32 | 1.39 | 0.7 | 0.7 | P + θ | 1029 | 33.4 | 38 | 34369 | 480 | 0.47 | 67.7 | 281 | Example |
| 33 | 1.35 | 0.8 | 0.7 | P + θ | 1003 | 33.0 | 36 | 33099 | 450 | 0.45 | 69.4 | 307 | Example |
| 34 | 1.25 | 0.8 | 0.8 | P + θ | 1004 | 34.3 | 35 | 34437 | 470 | 0.47 | 64.8 | 316 | Example |
| 35 | 1.26 | 0.5 | 0.4 | P + θ | 820 | 43.2 | 47 | 35424 | 400 | 0.49 | 58.9 | 315 | Example |
| 36 | 1.34 | 0.8 | 0.8 | P + θ | 895 | 39.3 | 43 | 35174 | 440 | 0.49 | 62.6 | 329 | Example |
| 37 | 1.28 | 1.0 | 0.9 | P + θ | 987 | 38.0 | 38 | 37506 | 430 | 0.44 | 65.7 | 329 | Example |
| 38 | 1.38 | 0.4 | 0.4 | P + θ | 1020 | 37.4 | 40 | 38148 | 450 | 0.44 | 66.5 | 311 | Example |

TABLE 3-continued

| 39 | 1.36 | 0.6 | 0.5 | P + θ | 1089 | 34.4 | 42 | 37462 | 490 | 0.45 | 69.3 | 303 | Example |
| 40 | 1.28 | 0.5 | 0.3 | P + θ | 995 | 38.5 | 43 | 38308 | 460 | 0.46 | 63.3 | 336 | Example |
| 41 | 1.33 | 0.8 | 0.7 | P + θ | 1034 | 36.9 | 41 | 38155 | 490 | 0.47 | 65.8 | 324 | Example |
| 42 | 1.27 | 0.8 | 0.8 | P + θ | 1025 | 37.2 | 38 | 38130 | 490 | 0.48 | 65.8 | 311 | Example |
| 43 | 1.25 | 0.7 | 0.6 | P + θ | 1008 | 36.7 | 39 | 36994 | 490 | 0.49 | 64.6 | 327 | Example |
| 44 | 1.59 | 0.9 | 0.9 | P + θ | 801 | 35.5 | 45 | 28436 | 430 | 0.54 | 65.6 | 329 | Example |
| 45 | 1.65 | 0.8 | 0.6 | P + θ | 1022 | 29.6 | 38 | 30251 | 480 | 0.47 | 68.1 | 193 | Example |
| 46 | 1.66 | 0.7 | 0.6 | P + θ | 783 | 35.2 | 47 | 27562 | 400 | 0.51 | 65.4 | 328 | Example |
| 47 | 1.68 | 0.9 | 0.8 | P + θ | 992 | 27.5 | 36 | 27280 | 470 | 0.47 | 65.1 | 205 | Example |
| 48 | 1.59 | 0.5 | 0.6 | P + θ | 1188 | 25.1 | 31 | 29819 | 530 | 0.45 | 70.2 | 214 | Example |
| 49 | 1.55 | 0.6 | 0.5 | P + θ | 1077 | 30.1 | 37 | 32418 | 500 | 0.46 | 69.2 | 288 | Example |
| 50 | 1.47 | 0.6 | 0.5 | P + θ | 1131 | 28.6 | 34 | 32347 | 530 | 0.47 | 73.5 | 234 | Example |
| 51 | 1.69 | 0.7 | 0.8 | P + θ | 1221 | 28.7 | 27 | 35043 | 550 | 0.45 | 75.1 | 140 | Example |
| 52 | 1.70 | 0.9 | 0.8 | P + θ | 985 | 29.3 | 37 | 28861 | 480 | 0.49 | 71.5 | 247 | Example |
| 53 | 1.60 | 0.6 | 0.7 | P + θ | 1144 | 27.1 | 32 | 31002 | 530 | 0.46 | 69.3 | 221 | Example |
| 54 | 1.59 | 0.6 | 0.6 | P + θ | 1142 | 29.4 | 33 | 33575 | 540 | 0.47 | 71.8 | 197 | Example |
| 55 | 1.74 | 0.7 | 0.7 | P + θ | 1071 | 32.1 | 34 | 34379 | 500 | 0.47 | 70.1 | 224 | Example |

Underlined if outside of the disclosed range.
F: ferrite, BF: bainitic ferrite, RA: retained austenite, M: martensite, TM: tempered martensite, P: pearlite, θ: cementite, A: austenite
*Fraction of A immediately after second annealing treatment (%)

It can be seen that the high-strength steel sheets according to examples each have a TS of 780 MPa or more, and are each excellent not only in ductility, but also in fatigue properties, balance between high strength and ductility, stretch flangeability, surface characteristics, and sheet passage ability. In contrast, comparative examples are inferior in terms of one or more of strength, ductility, balance between high strength and ductility, fatigue properties, stretch flangeability, surface characteristics, and sheet passage ability.

The invention claimed is:

1. A high-strength steel sheet comprising:
a chemical composition containing, in mass %, C: 0.08% or more and 0.35% or less, Si: 0.50% or more and 2.50% or less, Mn: 1.50% or more and 3.00% or less, P: 0.001% or more and 0.100% or less, S: 0.0001% or more and 0.0200% or less, and N: 0.0005% or more and 0.0100% or less, and optionally at least one element selected from the group consisting of Al: 0.01% or more and 1.00% or less, Ti: 0.005% or more and 0.100% or less, Nb: 0.005% or more and 0.100% or less, B: 0.0001% or more and 0.0050% or less, Cr: 0.05% or more and 1.00% or less, Cu: 0.05% or more and 1.00% or less, Sb: 0.0020% or more and 0.2000% or less, Sn: 0.0020% or more and 0.2000% or less, Ta: 0.0010% or more and 0.1000% or less, Ca: 0.0003% or more and 0.0050% or less, Mg: 0.0003% or more and 0.0050% or less, and REM: 0.0003% or more and 0.0050% or less, and the balance consisting of Fe and incidental impurities; and
a steel microstructure that contains, by area, 20% or more and 50% or less of ferrite, 5% or more and 25% or less of bainitic ferrite, 1% or more and 10% or less of martensite, and 5% or more and 15% or less of tempered martensite, and by volume, 10% or more of retained austenite, wherein
the retained austenite has a mean grain size of 2 μm or less,
a mean Mn content in the retained austenite in mass % is at least 1.2 times the Mn content in the steel sheet in mass %,
the retained austenite has a mean free path of 1.2 μm or less, and
the tempered martensite has a mean free path of 1.2 μm or less, and
wherein the high-strength steel sheet has a tensile strength (TS) of 780 MPa or more and satisfies:
total elongation (EL)≥34% for TS 780 MPa grade, EL≥27% for TS 980 MPa grade, and EL≥23% for TS 1180 MPa grade,
stretch flangeability (λ)≥40% for TS 780 MPa grade, λ≥30% for TS 980 MPa grade, and λ≥20% for TS 1180 MPa grade,
fatigue limit strength≥400 MPa, and
fatigue ratio≥0.40.

2. A production method for a high-strength steel sheet, the method comprising:
heating a steel slab having the chemical composition as recited in claims 1 to 1100° C. or higher and 1300° C. or lower;
hot rolling the steel slab with a finisher delivery temperature of 800° C. or higher and 1000° C. or lower to obtain a steel sheet;
coiling the steel sheet at a mean coiling temperature of 450° C. or higher and 700° C. or lower;
subjecting the steel sheet to pickling treatment;
optionally, retaining the steel sheet at a temperature of 450° C. or higher and $Ac_1$ transformation temperature or lower for 900 s or more and 36000 s or less,
cold rolling the steel sheet at a rolling reduction of 30% or more;
subjecting the steel sheet to first annealing treatment whereby the steel sheet is heated to a temperature of 820° C. or higher and 950° C. or lower;
cooling the steel sheet to a first cooling stop temperature at or below Ms at a mean cooling rate to 500° C. of 15° C./s or higher;
subjecting the steel sheet to second annealing treatment whereby the steel sheet is reheated to a temperature of 740° C. or higher and 840° C. or lower;
cooling the steel sheet to a cooling stop temperature of 150° C. or higher and 350° C. or lower at a cooling rate of 1° C./s or higher and 15° C./s or lower; and
reheating the steel sheet to a reheating temperature of higher than 350° C. and 550° C. or lower and retaining the steel sheet at the reheating temperature for 10 s or more, to produce the high-strength steel sheet as recited in claim 1.

3. A production method for a high-strength galvanized steel sheet, the method comprising subjecting the high-strength steel sheet as recited in claim 1 to galvanizing treatment.

* * * * *